(12) United States Patent
Kwon et al.

(10) Patent No.: US 11,391,992 B2
(45) Date of Patent: Jul. 19, 2022

(54) LIQUID CRYSTAL DISPLAY AND MANUFACTURING METHOD THEREOF

(71) Applicant: Samsung Display Co., Ltd., Yongin-si (KR)

(72) Inventors: Oh Jeong Kwon, Hwaseong-si (KR); Ka Eun Kim, Seongnam-si (KR); Tae Min Kim, Hwaseong-si (KR); Duck Jong Suh, Gwangmyeong-si (KR); Bong-Sung Seo, Suwon-si (KR); Seul Gee Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 167 days.

(21) Appl. No.: 15/981,032

(22) Filed: May 16, 2018

(65) Prior Publication Data

US 2019/0064605 A1    Feb. 28, 2019

(30) Foreign Application Priority Data

Aug. 22, 2017   (KR) .................. 10-2017-0106151

(51) Int. Cl.
*G02F 1/1337* (2006.01)
*C09D 179/08* (2006.01)
(Continued)

(52) U.S. Cl.
CPC .... *G02F 1/133711* (2013.01); *C08G 73/1078* (2013.01); *C09D 179/08* (2013.01);
(Continued)

(58) Field of Classification Search
CPC ................ C09K 19/56; C09K 2323/02; G02F 1/133707; G02F 2001/133726;
(Continued)

(56) References Cited

U.S. PATENT DOCUMENTS

| 7,169,449 B2 | 1/2007 | Nakanishi et al. |
| 2005/0116200 A1 | 6/2005 | Nakanishi et al. |

(Continued)

FOREIGN PATENT DOCUMENTS

| CN | 105733608 A | * | 7/2016 | ......... C09K 19/3458 |
| EP | 1340118 B1 | | 2/2011 | |

(Continued)

OTHER PUBLICATIONS

Extended European Search Report dated Nov. 6, 2018, of the corresponding European Patent Application No. 18185810.1.

(Continued)

*Primary Examiner* — Sophie Hon
(74) *Attorney, Agent, or Firm* — Cantor Colburn LLP

(57) ABSTRACT

A liquid crystal display includes: a first substrate; a second substrate overlapping the first substrate and spaced apart therefrom; a liquid crystal layer between the first substrate and the second substrate and including liquid crystal molecules; a first alignment layer between the first substrate and the liquid crystal layer; and a plurality of protrusions between the first alignment layer and the liquid crystal layer, wherein the first alignment layer includes a photoinitiator, wherein the plurality of protrusions include a polymerization product of the photoinitiator, a reactive mesogen, and a vertical alignment additive, and the vertical alignment additive may be less reactive than the photoinitiator.

20 Claims, 13 Drawing Sheets

(51) Int. Cl.
  *C08G 73/10* (2006.01)
  *C09K 19/56* (2006.01)
  *G02F 1/1368* (2006.01)

(52) U.S. Cl.
  CPC ........ *C09K 19/56* (2013.01); *G02F 1/133707* (2013.01); *G02F 1/133788* (2013.01); *C09K 2323/02* (2020.08); *G02F 1/1368* (2013.01); *G02F 1/133726* (2021.01); *G02F 1/133742* (2021.01); *G02F 1/133746* (2021.01); *G02F 1/133749* (2021.01); *G02F 1/133757* (2021.01); *G02F 1/133773* (2021.01); *G02F 1/133776* (2021.01); *G02F 2202/022* (2013.01)

(58) Field of Classification Search
  CPC ........ G02F 2001/133742; G02F 2001/133715; G02F 2001/133788; G02F 1/133726; G02F 1/133742; G02F 1/133715; G02F 1/13788; Y10T 428/1005; C09D 179/08
  See application file for complete search history.

(56) References Cited

U.S. PATENT DOCUMENTS

| | | | | |
|---|---|---|---|---|
| 2011/0102720 A1* | 5/2011 | Mizusaki | ................ | C08F 20/00 349/123 |
| 2013/0182202 A1 | 7/2013 | Graziano et al. | | |
| 2014/0240649 A1* | 8/2014 | Shen | ..................... | G02F 1/1337 349/106 |
| 2015/0085236 A1* | 3/2015 | Kanehiro | .......... | G02F 1/133719 349/124 |
| 2015/0378193 A1* | 12/2015 | Song | ................... | G02F 1/13725 349/96 |
| 2016/0026041 A1 | 1/2016 | Lim | | |
| 2016/0170268 A1* | 6/2016 | Song | ................ | G02F 1/133707 349/123 |
| 2016/0274389 A1 | 9/2016 | Kim | | |
| 2017/0059941 A1 | 3/2017 | Lee et al. | | |
| 2018/0120652 A1* | 5/2018 | Lan | .................... | C09K 19/3458 |

FOREIGN PATENT DOCUMENTS

| | | |
|---|---|---|
| JP | 2014218664 A | 11/2014 |
| KR | 1020160002599 A | 1/2016 |
| KR | 101618785 B1 | 4/2016 |
| KR | 1020170010242 A | 1/2017 |
| KR | 1020170024630 A | 3/2017 |
| WO | 2012038026 A1 | 3/2012 |
| WO | WO-2014142168 A1 * | 9/2014 .............. C08F 12/22 |

OTHER PUBLICATIONS

Office Action dated Oct. 7, 2021 of the corresponding Korean Patent Application No. 10-2017-0106151.

* cited by examiner

LIQUID CRYSTAL DISPLAY AND MANUFACTURING METHOD THEREOF

This application claims priority to and the benefit of Korean Patent Application No. 10-2017-0106151 filed in the Korean Intellectual Property Office on Aug. 22, 2017, the entire contents of which are incorporated herein by reference.

BACKGROUND

(a) Technical Field

The present disclosure relates to a liquid crystal display and a method of manufacturing the liquid crystal display. The liquid crystal display and the manufacturing method thereof, may prevent texture occurrence in a curved display device.

(b) Description of the Related Art

A liquid crystal display includes two sheets of display panels in which field generating electrodes, such as pixel electrodes and common electrodes, are formed, and a liquid crystal layer interposed between the display panels.

The liquid crystal display applies a voltage to the field generating electrodes in order to generate an electric field in the liquid crystal layer, determines the direction of liquid crystal molecules in the liquid crystal layer based on the electric field, and displays an image by controlling the polarization of incident light.

In addition, a curved display device has been developed to improve the sense of immersion by the viewer. In a curved display device, it is desirable to maintain the same color and image quality as a flat display device when the curved display device is in operation.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a liquid crystal display and a manufacturing method thereof that may prevent texture occurrence.

An exemplary embodiment provides a liquid crystal display including: a first substrate, a second substrate overlapping the first substrate and spaced apart therefrom, a liquid crystal layer between the first substrate and the second substrate, and comprising liquid crystal molecules, a first alignment layer between the first substrate and the liquid crystal layer; and a plurality of protrusions between the first alignment layer and the liquid crystal layer, wherein the first alignment layer comprises a photoinitiator, wherein the plurality of protrusions comprise a polymerization product of the photoinitiator, a reactive mesogen, and a vertical alignment additive, and the vertical alignment additive is less reactive than the photoinitiator.

The photoinitiator may be benzophenone.

The liquid crystal display may have a curved shape.

No protrusion of the plurality of protrusions may be present between the second substrate and the liquid crystal layer.

Liquid crystal molecules adjacent to the first substrate may be aligned at a pretilt angle, and liquid crystal molecules adjacent to the second substrate may be aligned at an angle perpendicular to the second substrate.

A difference between the pretilt angle of the liquid crystal molecules adjacent to the first substrate and the angle of the liquid crystal molecules adjacent to the second substrate may be 0.2 degree or greater.

The vertical alignment additive may include a hydroxyl group at an end thereof.

The vertical alignment additive does not include a biphenyl structure, and may include two or more end groups represented by Chemical Formula 6.

[Chemical Formula 6]

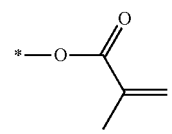

The vertical alignment additive may include a biphenyl structure, and may include two or more end groups represented by Chemical Formula 7.

[Chemical Formula 7]

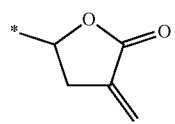

The vertical alignment additive may be one or more of compounds represented by Chemical Formulas 1 to 5.

[Chemical Formula 1]

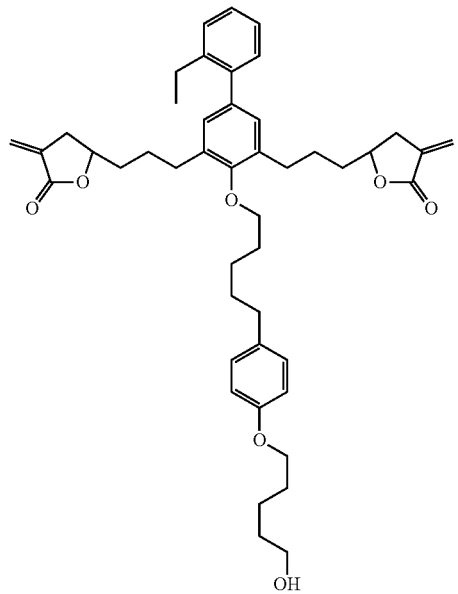

[Chemical Formula 2]

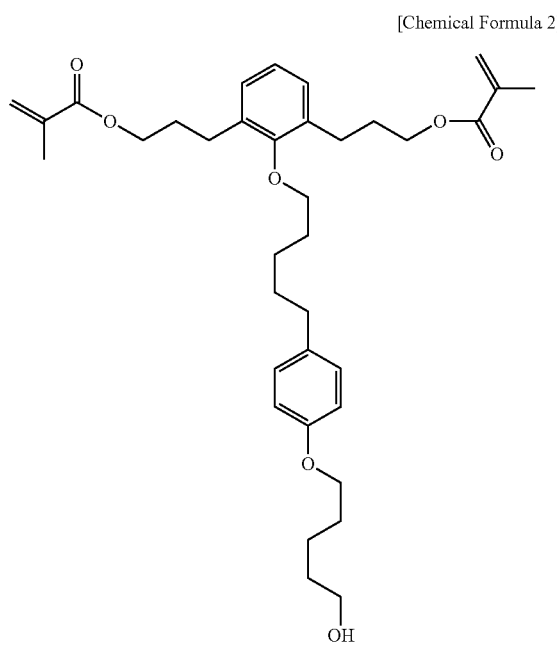

[Chemical Formula 3]

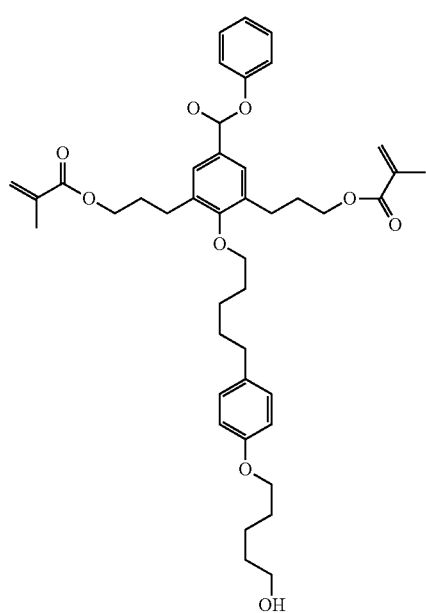

[Chemical Formula 4]

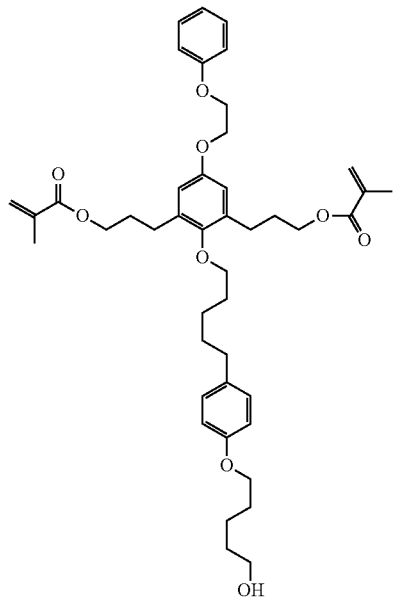

[Chemical Formula 5]

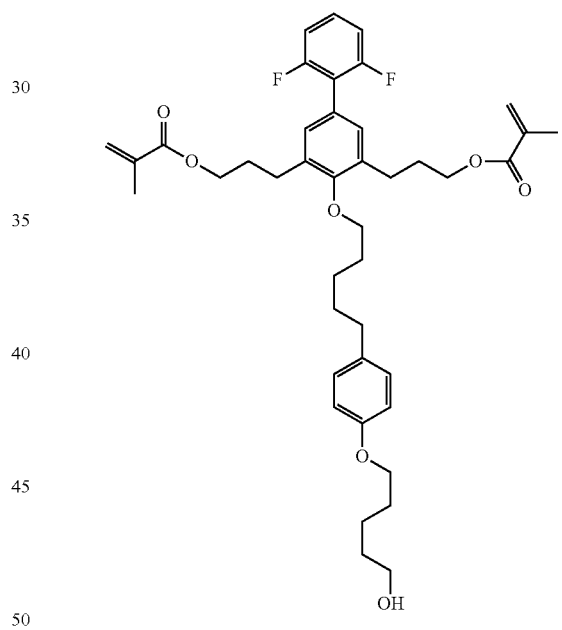

Another embodiment provides a liquid crystal display including: a first substrate, a second substrate overlapping the first substrate and spaced apart therefrom, a liquid crystal layer between the first substrate and the second substrate and comprising liquid crystal molecules, a first alignment layer positioned between the first substrate and the liquid crystal layer; and a plurality of protrusions between the first alignment layer and the liquid crystal layer, wherein the first alignment layer comprises a photoinitiator, wherein the plurality of protrusions comprise a polymerization product of the photoinitiator, a reactive mesogen, and a vertical alignment additive, and wherein an alignment layer is not present between the second substrate and the liquid crystal layer.

The vertical alignment additive may be less reactive than the photoinitiator.

No protrusion of the plurality of protrusions is present between the second substrate and the liquid crystal layer.

The vertical alignment additive may include a hydroxyl group at an end thereof.

The vertical alignment additive does not include a biphenyl structure and may include two or more end groups represented by Chemical Formula 6, or the vertical alignment additive may include a biphenyl structure and may include two or more end groups represented by Chemical Formula 7.

[Chemical Formula 6]

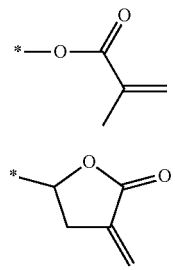

[Chemical Formula 7]

The liquid crystal display may have a curved shape.

The photoinitiator may be benzophenone.

No protrusion of the plurality of protrusions may be present between the second substrate and the liquid crystal layer.

Liquid crystal molecules adjacent to the first substrate may be aligned at a pretilt angle, and liquid crystal molecules adjacent to the second substrate may be aligned at an angle perpendicular to the second substrate.

A difference between the pretilt angle of the liquid crystal molecules adjacent to the first substrate and the angle of the liquid crystal molecules adjacent to the second substrate may be 0.2 degree or more.

The vertical alignment additive may be one or more of compounds represented by Chemical Formulas 1 to 5.

[Chemical Formula 1]

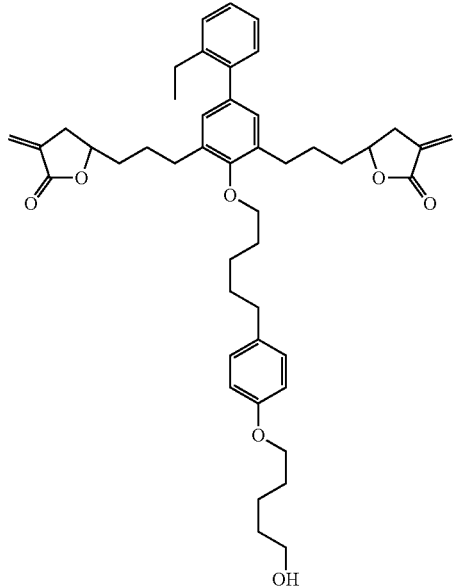

[Chemical Formula 2]

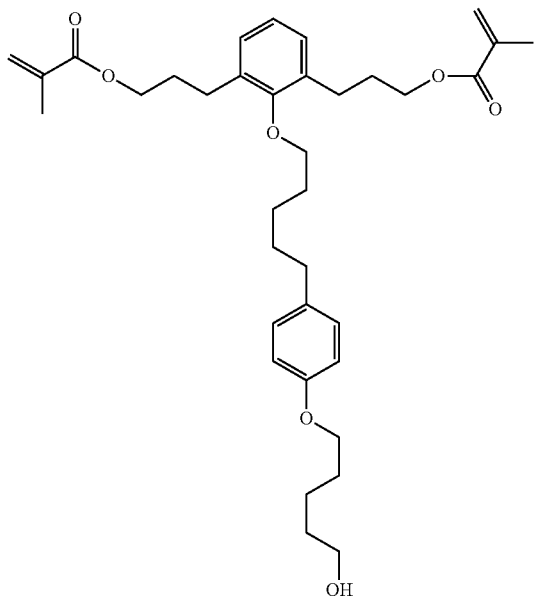

[Chemical Formula 3]

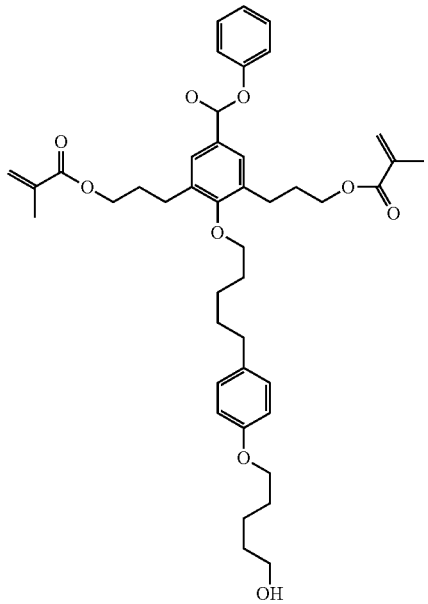

[Chemical Formula 4]

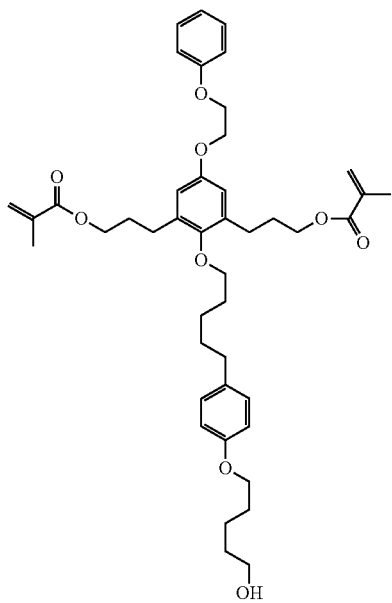

[Chemical Formula 5]

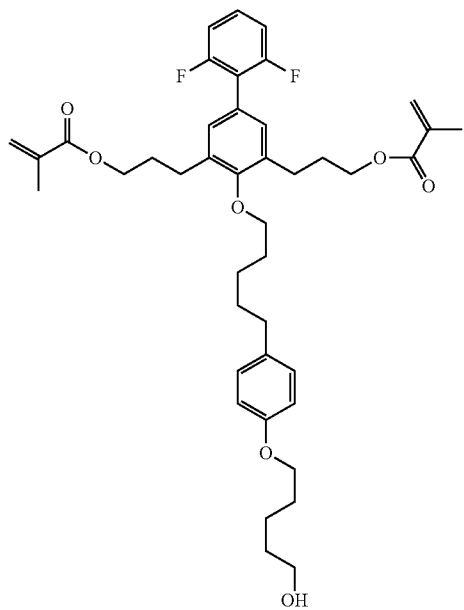

Yet another embodiment provides a method of manufacturing a liquid crystal display, including: providing a first substrate including a first alignment layer; providing a second substrate overlapping the first substrate; forming a liquid crystal layer including a plurality of liquid crystal molecules, a reactive mesogen, and a vertical alignment additive between the first substrate and the second substrate; irradiating ultraviolet (UV) light toward the first substrate and the second substrate, and polymerizing the photoinitiator, the reactive mesogen, and the vertical alignment additive to form the liquid crystal display, wherein the first alignment layer includes a photoinitiator, and wherein the photoinitiator, the reactive mesogen, and the vertical alignment additive may be polymerized by the ultraviolet light to form a plurality of protrusions on the first alignment layer.

The photoinitiator may be benzophenone.

The vertical alignment additive may be less reactive than the photoinitiator.

A content of the vertical alignment additives may be about 0.1 weight percent (wt %) to about 3 wt % based on the total weight of the liquid crystal layer.

After the irradiating of the ultraviolet light, liquid crystal molecules adjacent to the first substrate may be aligned at a pretilt angle, and liquid crystal molecules adjacent to the second substrate may be aligned at an angle perpendicular to the second substrate.

A difference between the pretilt angle of the liquid crystal molecules adjacent to the first substrate and the angle of the liquid crystal molecules adjacent to the second substrate may be 0.2 degree or greater.

The vertical alignment additive may include a hydroxyl group at an end thereof.

The vertical alignment additive does not include a biphenyl structure and may include two or more end groups represented by Chemical Formula 6, or the vertical alignment additive may include a biphenyl structure and may include two or more end groups represented by Chemical Formula 7.

[Chemical Formula 6]

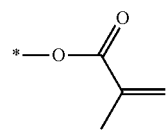

[Chemical Formula 7]

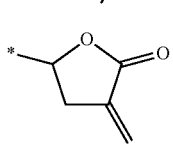

The vertical alignment additive may be one or more of compounds represented by Chemical Formulas 1 to 5.

[Chemical Formula 1]

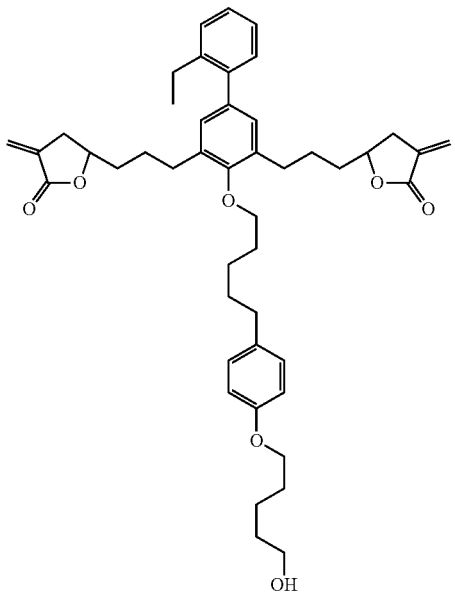

[Chemical Formula 2]

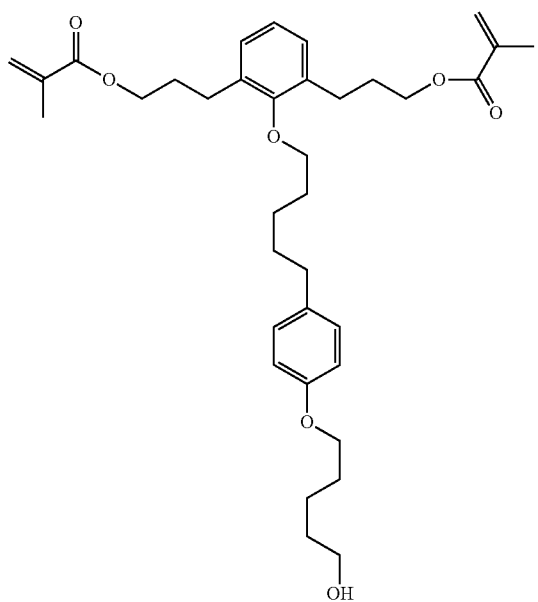

[Chemical Formula 3]

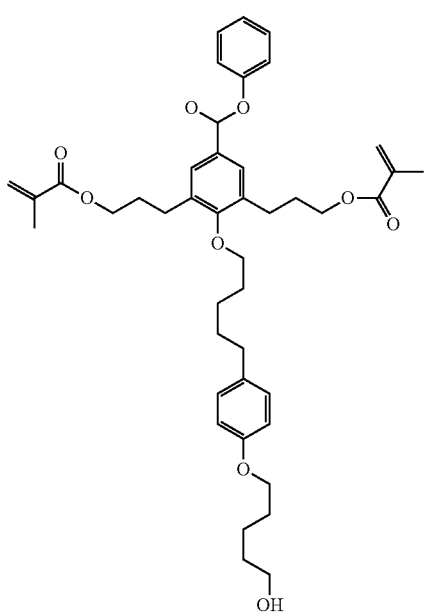

[Chemical Formula 4]

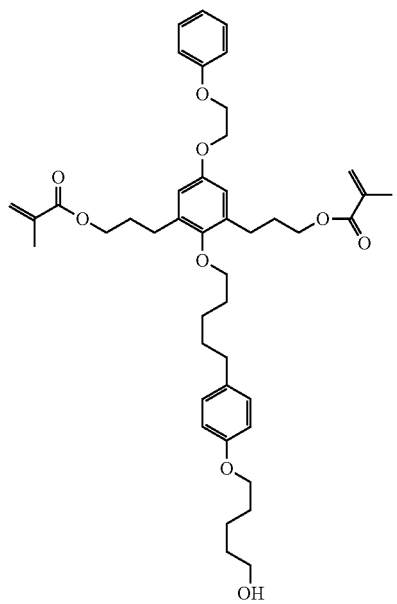

[Chemical Formula 5]

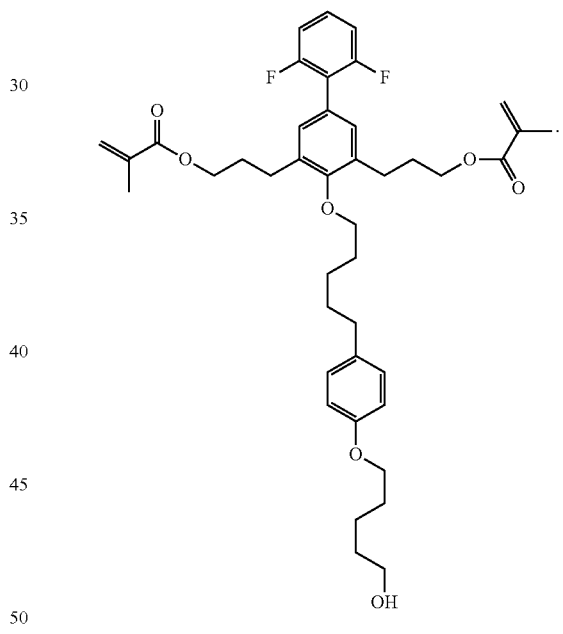

A central wavelength of the UV light may be about 300 nanometers (nm) to about 350 nm.

According to the liquid crystal display and the manufacturing method thereof of the exemplary embodiment of the present invention, it is possible to prevent texture occurrence.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
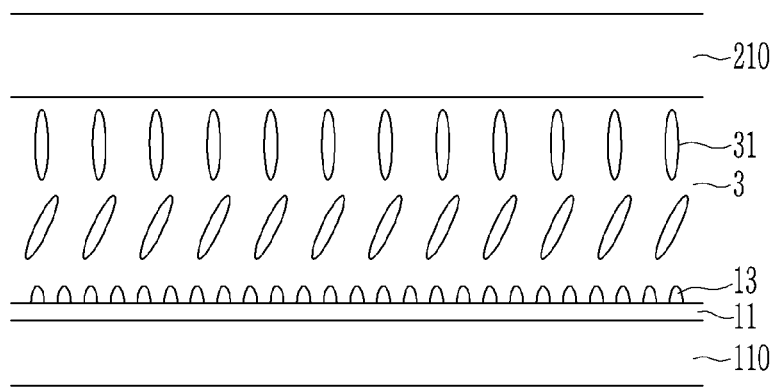
FIG. 1 is a schematic cross-sectional view of a liquid crystal display according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

To clearly describe the present invention, portions which do not relate to the description are omitted, and like reference numerals designate like elements throughout the specification.

Further, the size and thickness of each component shown in the drawings are arbitrarily shown for better understanding and ease of description, but the present invention is not limited thereto. In the drawings, the thicknesses of layers, films, panels, regions, etc., are exaggerated for clarity. For better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

The terminology used herein is for the purpose of describing particular embodiments only and is not intended to be limiting. As used herein, the singular forms "a," "an," and "the" are intended to include the plural forms, unless the content clearly indicates otherwise. "Or" means "and/or." As used herein, the term "and/or" includes any and all combinations of one or more of the associated listed items.

In addition, unless explicitly described to the contrary, the word "comprise" and variations such as "comprises" or "comprising" will be understood to imply the inclusion of stated elements but not the exclusion of any other elements.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Throughout the specification, the phrase "on a plane" means a view of the object or portion thereof from the top, and the phrase "on a cross-section" means a view of a cross-section of an object or a portion thereof which is vertically cut from the side.

Hereinafter, a liquid crystal display according to an exemplary embodiment of the present invention will be described with reference to the accompanying drawings. FIG. 1 illustrates a schematic cross-sectional view of a liquid crystal display according to an exemplary embodiment of the present invention. Referring to FIG. 1, a liquid crystal display according to present exemplary embodiment includes a first substrate 110, a second substrate 210 overlapping the first substrate 110 while being spaced apart from the first substrate 110, a liquid crystal layer 3 positioned between the first substrate 110 and the second substrate 210 and including liquid crystal molecules 31, a first alignment layer 11 positioned between the first substrate 110 and the liquid crystal layer 3, and a plurality of protrusions 13 positioned between the first alignment layer 11 and the liquid crystal layer 3.

However, in FIG. 1, an alignment layer is not positioned (present) between the second substrate 210 and the liquid crystal layer 3. In addition, there are no protrusions between the second substrate 210 and the liquid crystal layer 3. That is, in the liquid crystal display according to the present exemplary embodiment, the first alignment layer 11 and the protrusions 13 are positioned only on the first substrate 110, and the alignment layer and the protrusions are not positioned on the second substrate 210. Therefore, as will be described later in detail, it is possible for the pretilt angles of the liquid crystal molecules 31 adjacent to the first substrate 110 to be different from the pretilt angles of the liquid crystal molecules 31 adjacent to the second substrate 210.

Throughout this specification, the term "pretilt" means that a liquid crystal molecule 310 is tilted, or angled, relative to a direction perpendicular to a surface of the first alignment layer 11 or a second alignment layer 21, and the "pretilt angle" means a degree to which the liquid crystal molecules is tilted, that is, a tilt angle based on an axis perpendicular to the first alignment layer 11 or the second alignment layer 21.

In the present exemplary embodiment, the first alignment layer 11 includes a photoinitiator, and the plurality of protrusions 13 are include a polymerization product of, that is, are formed of a polymer obtained by polymerizing a photoinitiator, a reactive mesogen, and a vertical alignment additive included in the first alignment layer 11. The first alignment layer 11, which includes a photoinitiator, may contain benzophenone as the photoinitiator. The benzophenone serves to initiate the polymerization of the reactive mesogen and the vertical alignment additive.

include a compound represented by Chemical Formula 11, and a layer thereof which is closer to the liquid crystal layer 3 may include a compound represented by Chemical Formula 10. The compound represented by Chemical Formula 10 includes a benzophenone photoinitiator.

[Chemical Formula 10]

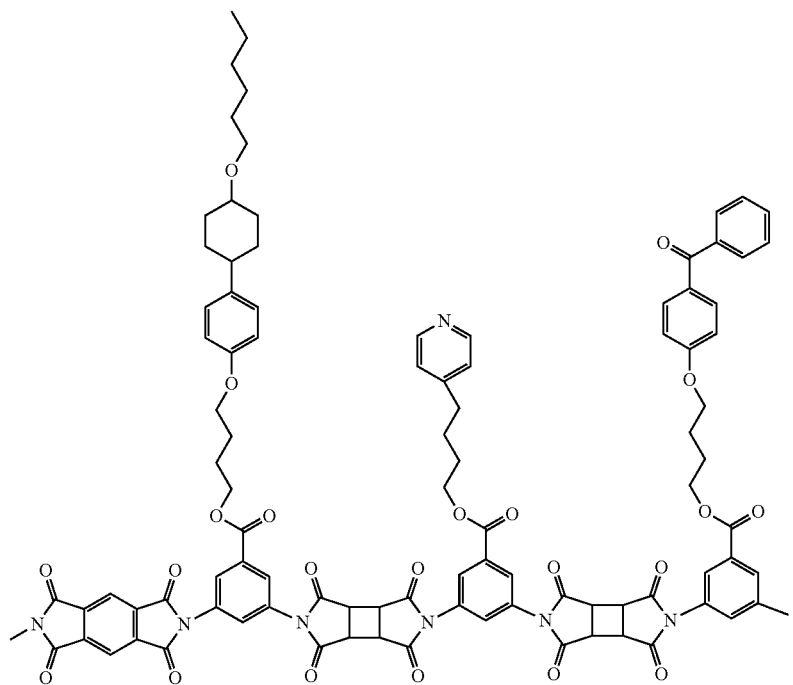

[Chemical Formula 11]

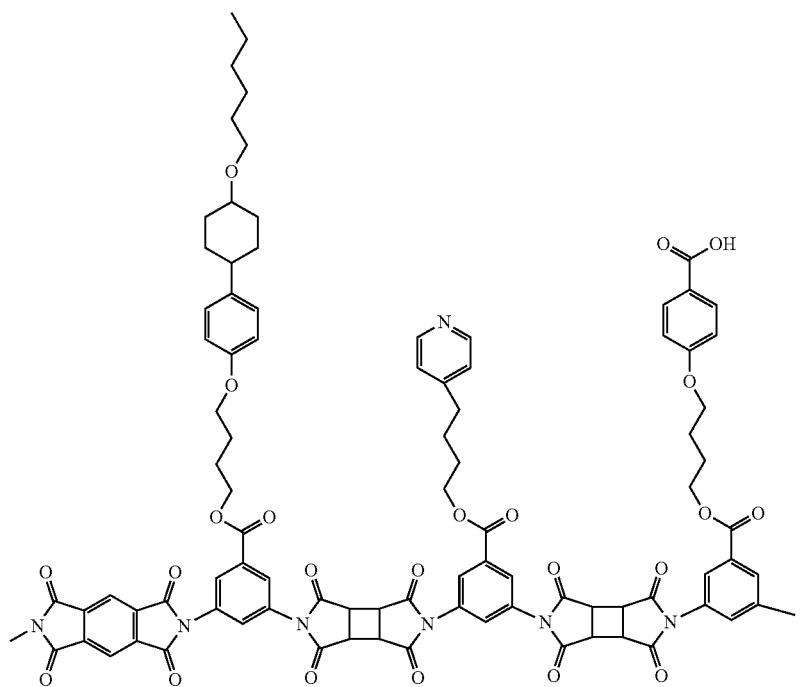

The first alignment layer 11 may include a compound represented by Chemical Formula 10 and a compound represented by Chemical Formula 11. The first alignment layer 11 may have a multi-layered structure, and in this case, a layer thereof which is closer to the first substrate 110 may The reactive mesogen may include one or more of an acrylate, a methacrylate, an epoxy, an oxetane, a vinyl-ether, or styrene.

The vertical alignment additive of the present exemplary embodiment may include a hydroxyl group (OH) at an end thereof, preferably at one end thereof, but does not include a biphenyl structure, and may include two or more end groups represented by Chemical Formula 6.

[Chemical Formula 6]

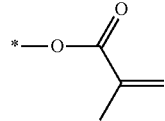

Alternatively, the vertical alignment additive according to an exemplary embodiment of the present invention may include a hydroxyl group (OH) at an end thereof, preferably at one end thereof, may have a biphenyl structure, and may include two or more end groups represented by Chemical Formula 7.

[Chemical Formula 7]

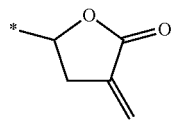

In Chemical Formulas 6 and 7, the mark * indicates a point of attachment of the end group to the structure of the vertical alignment additive.

For example, the vertical alignment additive of the present exemplary embodiment may be one or more of groups formed by Chemical Formulas 1 to 5.

[Chemical Formula 1]

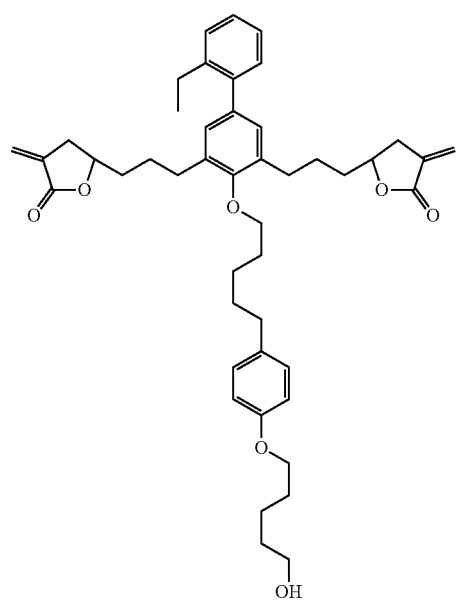

[Chemical Formula 2]

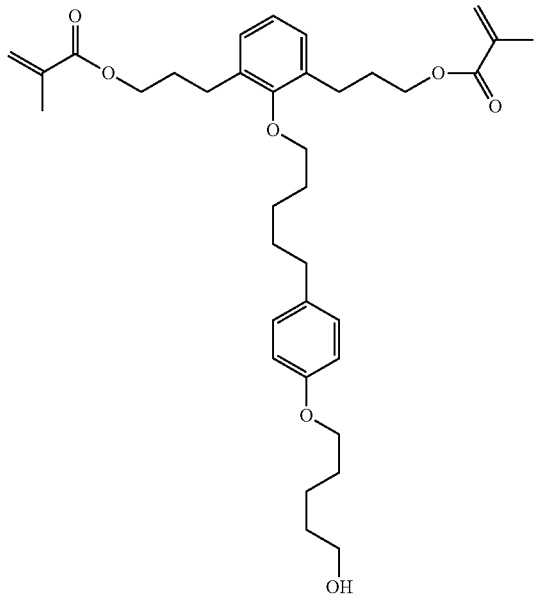

[Chemical Formula 3]

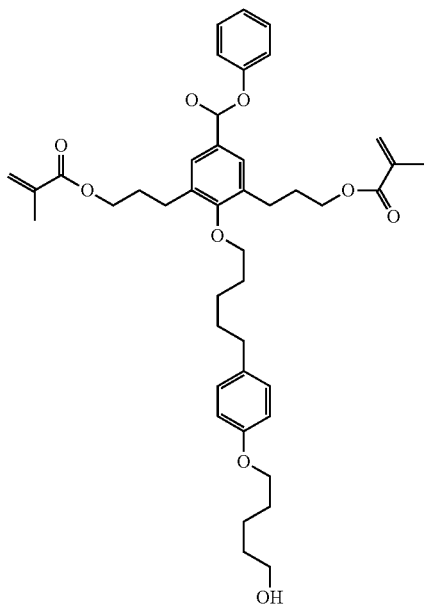

[Chemical Formula 4]

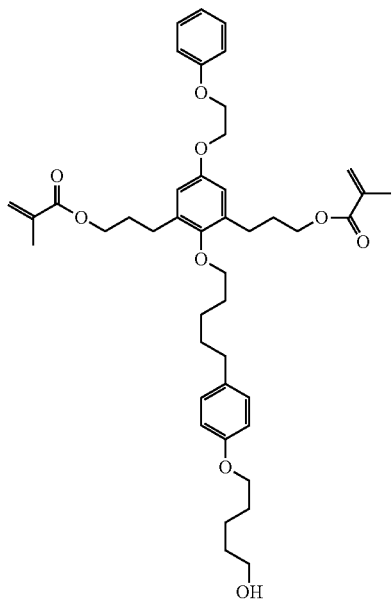

[Chemical Formula 5]

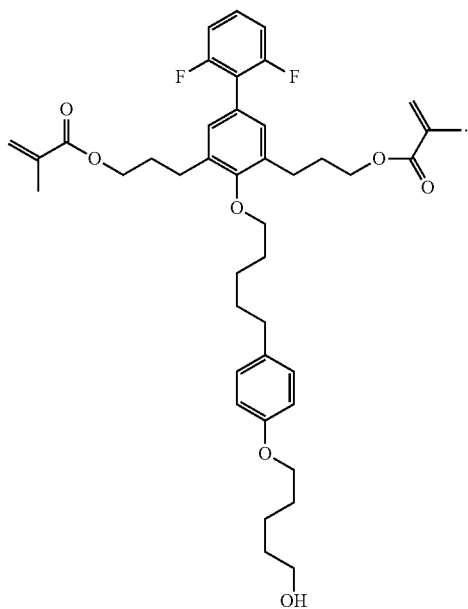

The vertical alignment additive having the above-mentioned structure is less reactive than the photoinitiator included in the first alignment layer 11. Accordingly, it is possible to prevent the vertical alignment additive from reacting with the reactive mesogen inside the liquid crystal layer to form a polymer.

In the present exemplary embodiment, the reactive mesogen and the vertical alignment additive are mixed with the liquid crystal molecules and injected into the liquid crystal layer, and are then polymerized upon exposure to ultraviolet (UV) light irradiation to form the protrusions 13.

The vertical alignment additive contains a photoreactive group in the structure thereof. Without being limited by theory, it is understood that when the reactivity of the vertical alignment additive is higher than the reactivity of the photoinitiator included in the first alignment layer 11, the vertical alignment additive does not react near the first alignment layer 11 but may instead react with the reactive mesogen or the like in the liquid crystal layer 3 and may thus be polymerized. When the vertical alignment additive is polymerized with the reactive mesogen in the liquid crystal layer, the polymerized polymer (polymerization product) may form the protrusions 13 at the second substrate 210 side.

However, when the protrusions 13 are formed on the second substrate 210 as well as on the first substrate 110, all of the liquid crystal molecules adjacent to the first substrate 110 and all of the liquid crystal molecules adjacent to the second substrate 210 have the same pretilt, which results in texture defects when the liquid crystal display corresponds to a curved display device. This is because the liquid crystal molecules, which are all aligned in the same direction, collide with each other due to the misalignment which occurs by bending of the first substrate 110 and the second substrate 210, and the alignment is disturbed.

As such, when the vertical alignment additive is more reactive than the photoreactive group or the reactive mesogen, the protrusions 13 are not formed only in the first alignment layer 11 because the polymerization reaction occurs without the photoreactive group.

Meanwhile, the liquid crystal display according to the present exemplary embodiment uses a material having decreased reactivity than the photoinitiator included in the first alignment layer, as the vertical alignment additive. Accordingly, the vertical alignment additive does not react until all of the photoinitiator included in the first alignment layer has reacted. After all of the photoinitiator in the first alignment layer has reacted, the vertical alignment additive polymerizes with the reactive mesogen and the adjacent vertical alignment additive near to the first alignment layer to form the protrusions. Thus, the protrusions 13 are not formed on the second substrate 210 that does not include a photoinitiator or an alignment layer which induces the polymerization reaction. In this case, for example, the photoinitiator included in the first alignment layer may be benzophenone. The reactivity of the vertical alignment additive represented by Chemical Formulas 1 to 5 is lower than the reactivity of the benzophenone.

That is, in the liquid crystal display according to the present exemplary embodiment, the first alignment layer 11 is formed only on the first substrate 110, an alignment layer is not formed on the second substrate 210, and a material having decreased reactivity than the photoinitiator included in the first alignment layer is used as the vertical alignment additive. Accordingly, the reaction of the vertical alignment additive occurs only the vicinity of the first alignment layer, i.e., the area in which the photoinitiator is positioned, and the vertical alignment additive is polymerized to form the protrusions 13 on the first alignment layer 11, and the protrusions induce the pretilt in the liquid crystal molecules near to (e.g., adjacent to) the first alignment layer.

However, since there is no alignment layer on the second substrate 210 and protrusions formed by polymerization of the vertical alignment additive are not formed thereon, the liquid crystal molecules near to the second substrate 210 in a UV light irradiation process are vertically aligned by the vertical alignment additive in the liquid crystal layer, but they are not tilted at a certain angle which is the same as the liquid crystal molecules near the first substrate 110.

That is, the liquid crystal molecules 31 adjacent to the first substrate 110 are aligned so as to have a predetermined pretilt, and the liquid crystal molecules adjacent to the second substrate 210 are aligned in a direction perpendicular to the second substrate. In this case, a difference between the pretilt of the liquid crystal molecules adjacent to the first substrate 110 and the angle of the liquid crystal molecules adjacent to the second substrate 210 may be 0.2 degree or more.

Figure 2:
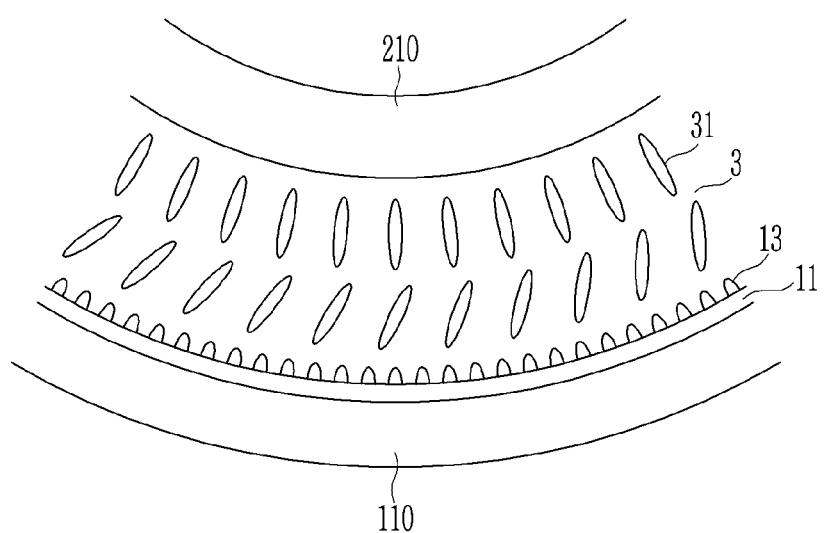
FIG. 2 is a schematic cross-sectional view of a liquid crystal display according to another exemplary embodiment of the present invention.

FIG. 2 is a cross-sectional view of a liquid crystal display according to an exemplary embodiment of the present invention. Referring to FIG. 2, the liquid crystal display according to the present exemplary embodiment may be a curved liquid crystal display. The liquid crystal display of FIG. 2 has the same structure as that of FIG. 1, except for having a curved structure, and a repeated description of the same structure will be omitted.

Figure 3:
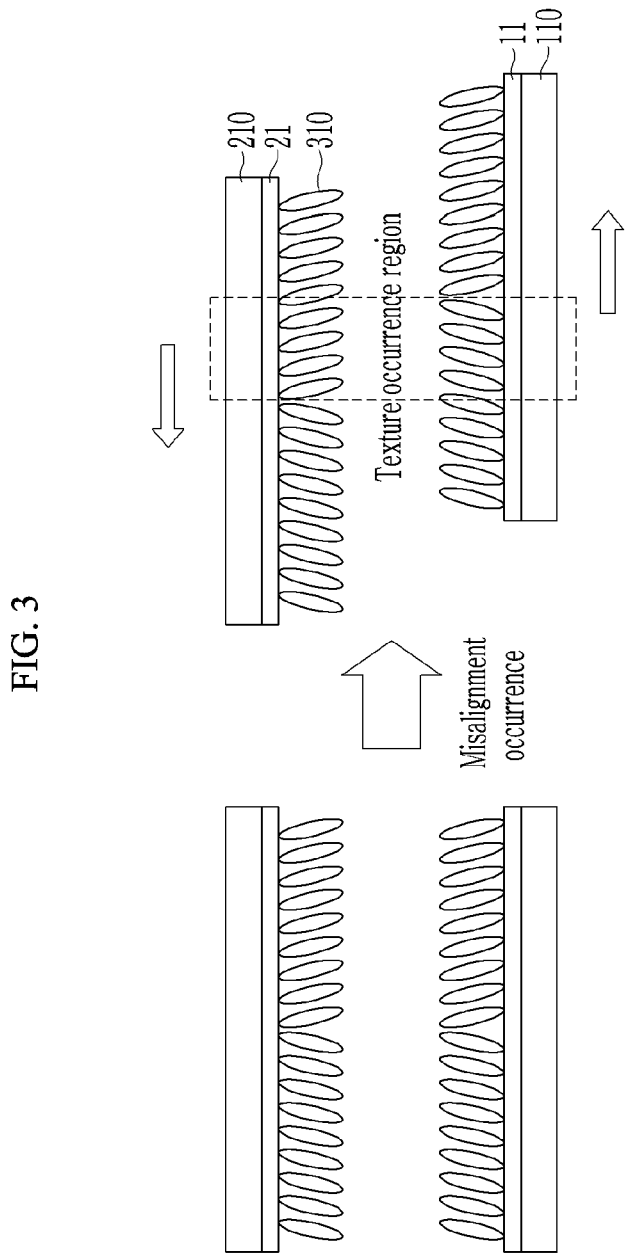
FIG. 3 is a schematic illustration explaining the development of a texture defect caused by a misalignment which occurs when pretilt angles of liquid crystal molecules adjacent to upper and lower alignment layers are the same.

FIG. 3 is a schematic view explaining the formation of a texture defect caused by a misalignment when pretilt angles of liquid crystal molecules adjacent to upper and lower alignment layers are the same. In the curved display device, when the pretilts are formed in both the liquid crystal molecules 31 adjacent to the first substrate 110 and the liquid crystal molecules 310 adjacent to the second substrate 210, the first substrate 110 and the second substrate 210 are misaligned in a bending process.

In a case that the liquid crystal molecules 310 are pretilted in the same direction in a region in which the first alignment layer 11 and the second alignment layer 21 overlap each other and are facing each other, when the display panel is misaligned, a misalignment region, in which the pretilt direction of the liquid crystal molecules 310 adjacent to the first alignment layer 11 and the pretilt direction of the liquid crystal molecules 310 adjacent to the second alignment layer 21, may occur. This misalignment region may be formed at a boundary of adjacent domains. In the misalignment region, a problem occurs in a direction in which the liquid crystal molecules 310 are tilted, and a texture defect occurs on a screen. Misalignment of the display panel may occur when the display panel is bent. The texture corresponds to a portion that appears darker than the surroundings and may be viewed as stains.

However, referring to FIG. 2, in the liquid crystal display according to the present exemplary embodiment, the first alignment layer 11 and the protrusions 13 are only present on the first substrate 110, the liquid crystal molecules near the first substrate 110 are aligned to have a tilt angle with respect to a vertical state (e.g., the pretilt angle), and since the second substrate 210 does not include an alignment layer or any protrusions, the liquid crystal molecules are aligned perpendicular to the substrate. Accordingly, when the first substrate 110 and the second substrate 210 are bent, it is difficult to prevent textures from occurring.

In this case, a difference between the pretilt angle of the liquid crystal molecules adjacent to the first substrate 110 and the angle of the liquid crystal molecules adjacent to the second substrate 210 may be about 0.2 degree or greater. As can be seen from Table 1, this is an angle difference that may reduce an amount of luminance change before and after bending.

Table 1 shows a change in transmittance and a luminance due to a pretilt difference between liquid crystal molecules of a lower substrate and liquid crystal molecules of an upper substrate of the liquid crystal display. That is, the luminance change amount in Table 1, is the difference between the luminance when the lower substrate and the upper substrate are aligned and when they are misaligned by 30 μm (i.e., in a case in which they are formed to have a curved shape).

TABLE 1

| Pretilt (degree) | | | Transmittance simulation (a.u.) | | Luminance change amount |
|---|---|---|---|---|---|
| Lower substrate | Upper substrate | Difference | Alignment | 30 um M/A | |
| 89.0 | 90.0 | 1.0 | 0.17072 | 0.17072 | 0.0 % |
|  | 89.8 | 0.8 | 0.17191 | 0.16988 | −1.2 % |
|  | 89.5 | 0.5 | 0.17339 | 0.16651 | −4.0 % |
|  | 89.2 | 0.2 | 0.17459 | 0.1625 | −6.9 % |
|  | 89.0 | 0.0 | 0.17527 | 0.15955 | −9.0 % |

Referring to Table 1, when the pretilts of the liquid crystal molecules adjacent to the upper substrate are the same as the pretilts of the liquid crystal molecules adjacent to the lower substrate of the liquid crystal display, when the liquid crystal display is bent in a curved shape, the luminance change amount is as great as −9%. However, as the pretilt difference between the two substrates increases, the luminance change amount decreases, and when the pretilt angle difference is 1 degree, the luminance change amount is 0%. That is, when the pretilt angle difference between the two substrates was 1 degree, it was confirmed that the luminance did not decrease at all even when the liquid crystal display was misaligned to a level of 30 μm.

As such, in the liquid crystal display according to the present exemplary embodiment, the first alignment layer 11 and the protrusions 13 are positioned only on the first substrate 110, and no alignment layer and no protrusions are positioned on the second substrate 210, and the protrusions 13 are polymers obtained by polymerizing the photoinitiator, the reactive mesogen, and the vertical alignment additive included in the first alignment layer 11. In this case, a material having decreased reactivity compared to the photoinitiator included in the first alignment layer 11 is used as a vertical alignment additive so that the protrusions 13 are formed only on the first substrate 110.

Figure 4:
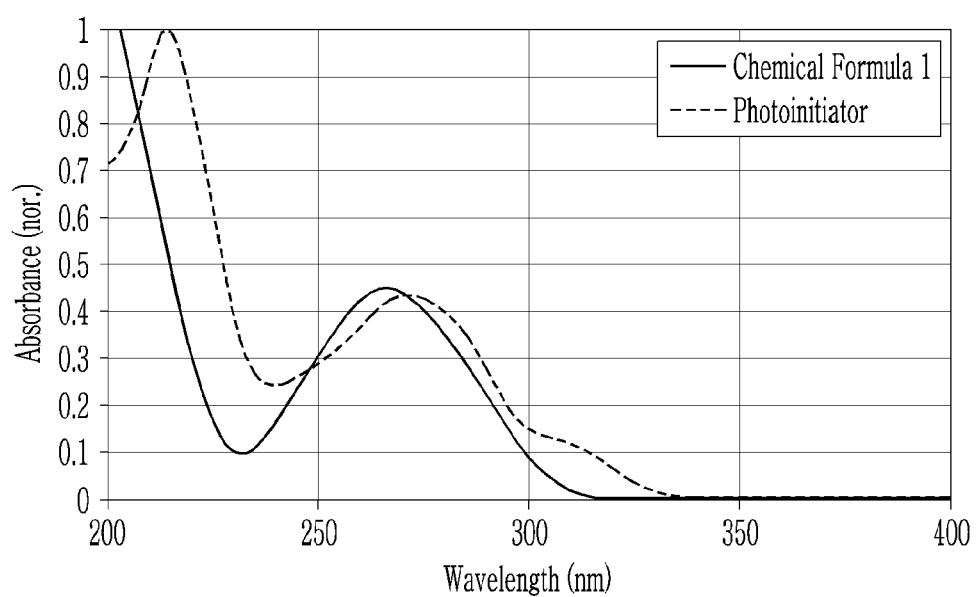
FIG. 4 is a graph of absorbance (normalized, nor.) versus wavelength (nm) comparing the absorbance spectrums of a vertical alignment additive represented by Chemical Formula 1 and a benzophenone photoinitiator.
Figure 5:
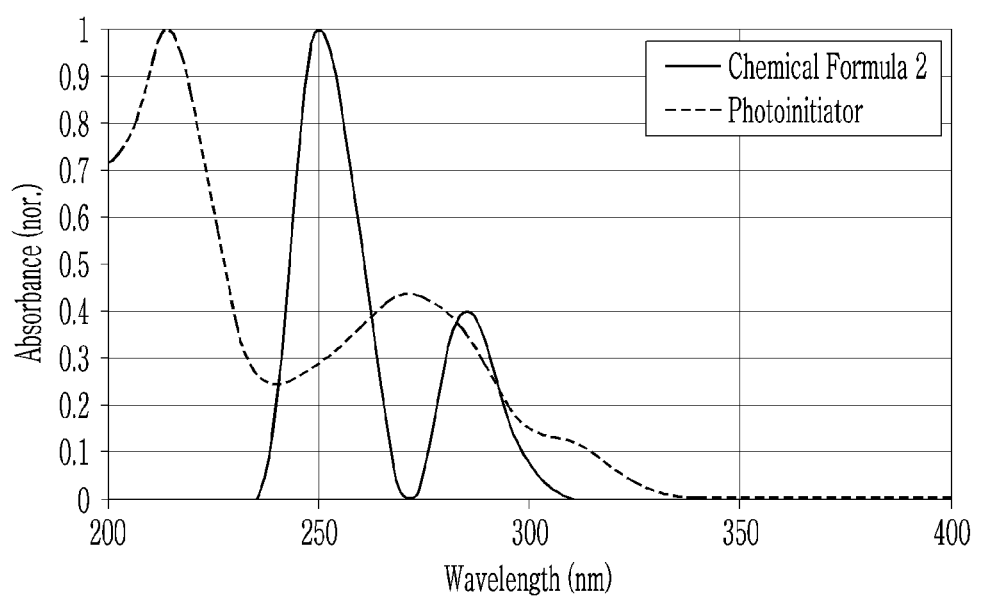
FIG. 5 is a graph of absorbance (nor.) versus wavelength (nm) comparing the absorbance spectrums of a vertical alignment additive represented by Chemical Formula 2 and a benzophenone photoinitiator.
Figure 6:
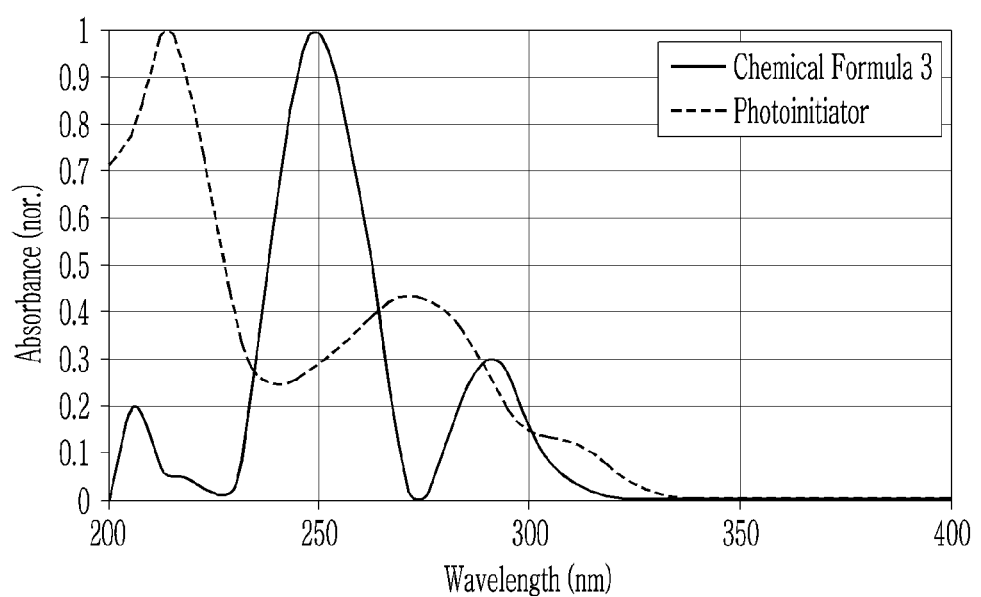
FIG. 6 is a graph of absorbance (nor.) versus wavelength (nm) comparing the absorbance spectrums of a vertical alignment additive represented by Chemical Formula 3 and a benzophenone photoinitiator.
Figure 7:
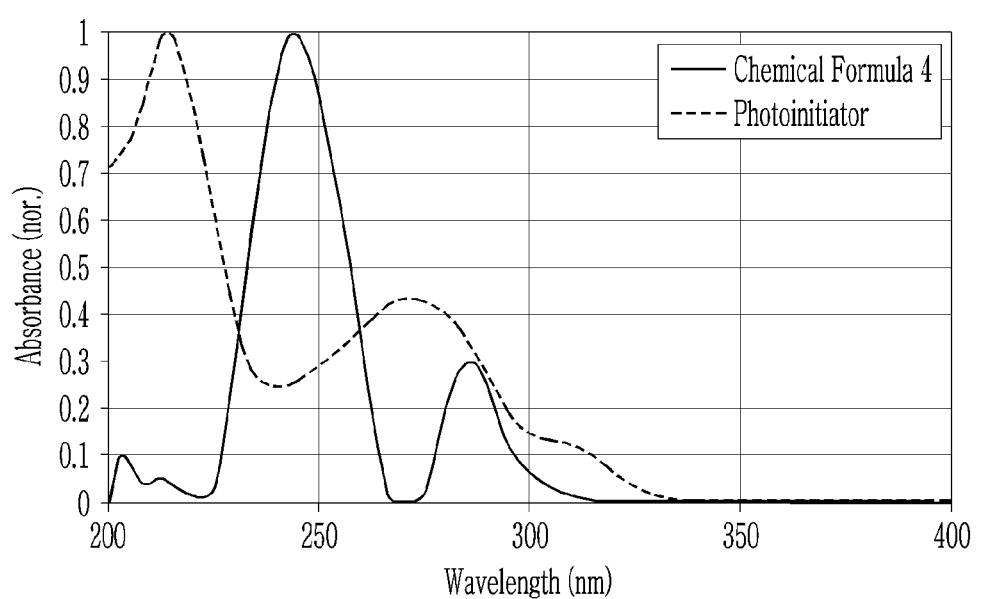
FIG. 7 is a graph of absorbance (nor.) versus wavelength (nm) comparing the absorbance spectrums of a vertical alignment additive represented by Chemical Formula 4 and a benzophenone photoinitiator.
Figure 8:
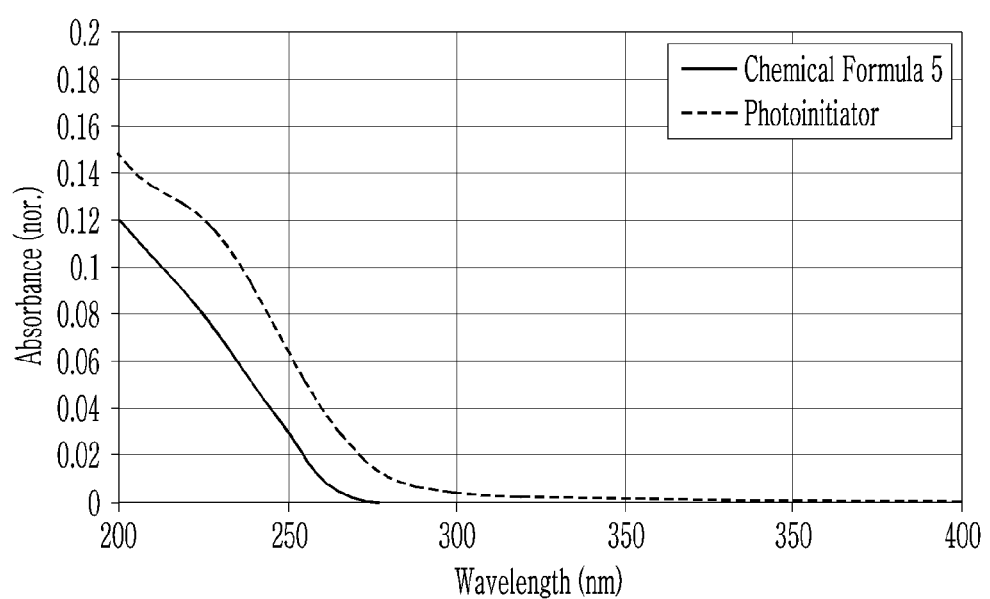
FIG. 8 is a graph of absorbance (nor.) versus wavelength (nm) comparing the absorbance spectrums of a vertical alignment additive represented by Chemical Formula 5 and a benzophenone photoinitiator.

FIG. 4 to FIG. 8 are graphs comparing the absorbance spectrums of various vertical alignment additives and benzophenone photoinitiators. FIG. 4 is a graph comparing the absorbance spectrum of a vertical alignment additive represented by Chemical Formula 1 and a benzophenone photoinitiator, and FIG. 5 is a graph comparing the absorbance spectrums of a vertical alignment additive represented by Chemical Formula 2 and a benzophenone photoinitiator. FIG. 6 is a graph comparing the absorbance spectrums of a vertical alignment additive represented by Chemical Formula 3 and a benzophenone photoinitiator, and FIG. 7 is a graph comparing the absorbance spectrums of a vertical alignment additive represented by Chemical Formula 4 and a benzophenone photoinitiator. FIG. 8 is a graph comparing the absorbance spectrum of a vertical alignment additive represented by Chemical Formula 5 and a benzophenone photoinitiator.

A central wavelength of the UV light used in the irradiation process is about 300 nm to about 350 nm, and the lower the absorbance spectrum for this wavelength range, the lower the reactivity.

Referring to FIG. 4 to FIG. 8, it can be seen that the compounds represented by Chemical Formula 1 to Chemical Formula 5 have a relatively lower absorbance spectra in comparison with benzophenone photoinitiators in the wavelength range of 300 nm to 350 nm. This means that the vertical alignment additives corresponding to the compounds represented by Chemical Formula 1 to Chemical Formula 5 are less reactive than the benzophenone photoinitiator, and thus, when the vertical alignment additives are added to the liquid crystal layer and the UV light is irradiated thereto, the vertical alignment additives do not react earlier than the benzophenone photoinitiator. Accordingly, it is possible to prevent the formation of protrusions due to polymerization of the vertical alignment additives on the second substrate 210 in which the photoinitiator is not present.

Hereinafter, the liquid crystal display according to the exemplary embodiment will be described more fully. However, this is merely an example, and the liquid crystal display of the present invention is not limited to the following structure.

Figure 9:
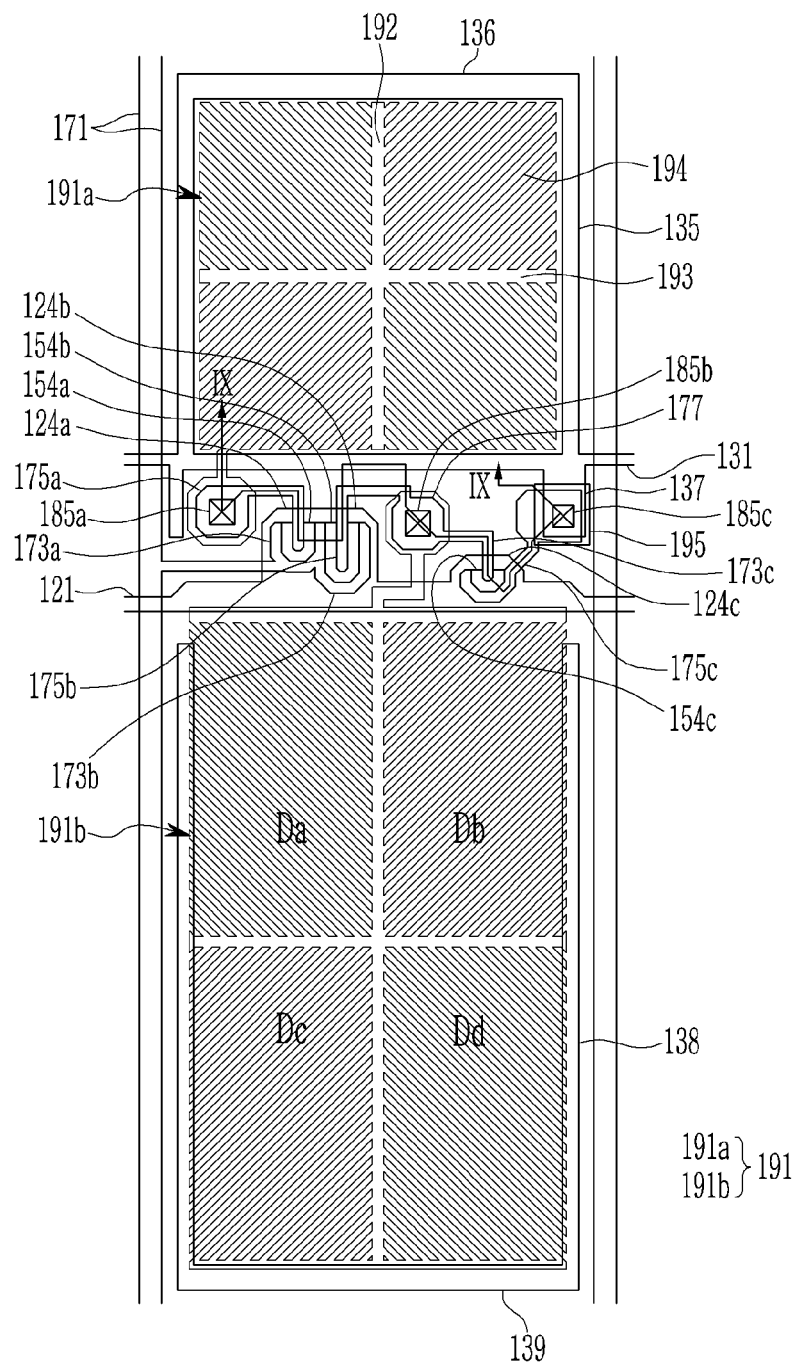
FIG. 9 is a plan view of a single pixel of a liquid crystal display according to an exemplary embodiment.
Figure 10:
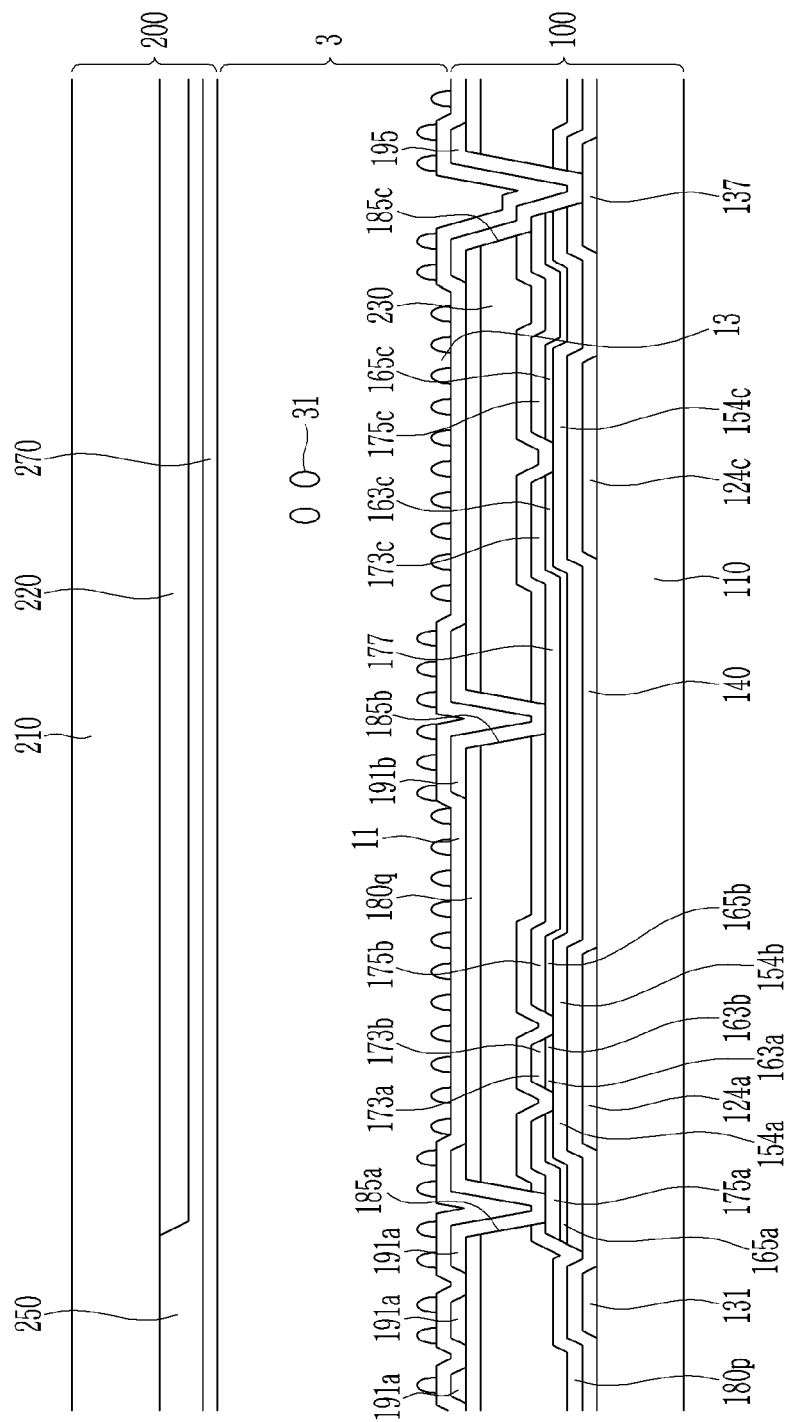
FIG. 10 is a cross-sectional view taken along line IX-IX of FIG. 9.

FIG. 9 is a plan view of a single pixel of a liquid crystal display according to an exemplary embodiment, and FIG. 10 illustrates a cross-sectional view of the pixel taken along line IX-IX of FIG. 9.

A first display panel 100 will be described first.

A gate conductor including a gate line 121 and a divided reference voltage line 131 is positioned on the first substrate 110 made of transparent glass or plastic.

The gate line 121 includes a first gate electrode 124a, a second gate electrode 124b, and a third gate electrode 124c.

The divided reference voltage line 131 includes first storage electrodes 135 and 136, and a reference electrode 137. Although not connected to the divided reference voltage line 131, second storage electrodes 138 and 139 may be positioned to overlap a second subpixel electrode 191b.

A gate insulating layer 140 is positioned on the gate line 121 and the divided reference voltage line 131.

A first semiconductor layer 154a, a second semiconductor layer 154b, and a third semiconductor layer 154c are positioned on the gate insulating layer 140. Ohmic contact members 163a, 165a, 163b, 165b, 163c, and 165c are positioned on semiconductor layer 154a, 154b, and 154c.

A data conductor including a data line 171 connected to a first source electrode 173a and a second source electrode 173b, a first drain electrode 175a, a second drain electrode 175b, a third source electrode 173c, and a third drain electrode 175c, is positioned on the ohmic contact members 163a, 165a, 163b, 165b, 163c, and 165c and the gate insulating layer 140.

The first gate electrode 124a, the first source electrode 173a, and the first drain electrode 175a form a first thin film transistor along with the first semiconductor layer 154a; the second gate electrode 124b, the second source electrode 173b, and the second drain electrode 175b form a second thin film transistor along with the second semiconductor layer 154b; and the third gate electrode 124c, the third source electrode 173c, and the third drain electrode 175c form a third thin film transistor along with the third semiconductor layer 154c.

The second drain electrode 175b is connected to the third source electrode 173c, and includes an extension portion 177 that is widely extended.

A first passivation layer 180p is positioned on the data conductors 171, 173c, 175a, 175b, and 175c and on the semiconductor layers 154a, 154b, and 154c.

A color filter 230 is positioned on the first passivation layer 180p. The color filter 230 extends in a vertical direction along two data lines 171 adjacent to each other. In the exemplary embodiment, it is described and illustrated that the color filter 230 is included in the first display panel 100, but the present invention is not limited thereto, and the color filter 230 may be included in a second display panel 200.

A second passivation layer 180q is positioned on the color filter 230. The first passivation layer 180p and the second passivation layer 180q may include an inorganic insulating layer such as a silicon nitride or a silicon oxide.

The second passivation layer 180q prevents the color filter 230 from being lifted and suppresses contamination of the liquid crystal layer 3 by an organic material such as a solvent flowing from the color filters 230, thereby preventing defects such as an afterimage while a screen is displayed.

The first passivation layer 180p and the second passivation layer 180q are provided with a first contact hole 185a and a second contact hole 185b respectively overlapping the first drain electrode 175a and the second drain electrode 175b.

The first passivation layer 180p, the second passivation layer 180q, and the gate insulating layer 140 are provided with a third contact hole 185c overlapping some of the reference electrode 137 and some of the third drain electrode 175c, and the third contact hole 185c is covered by a connecting member 195. The connecting member 195 electrically connects the reference electrode 137 overlapping the third contact hole 185c and the third drain electrode 175c.

A pixel electrode 191 is positioned on the second passivation layer 180q. The pixel electrode 191 corresponds to a field generating electrode, pixel electrodes 191 are separated from each other with the gate line 121 therebetween, and each of the pixel electrodes 191 includes a first subpixel electrode 191a and the second subpixel electrode 191b adjacent in a column direction based on the gate line 121.

The pixel electrode 191 may include a transparent material such as ITO and IZO.

Each of the first subpixel electrode 191a and the second subpixel electrode 191b has a quadrangular shape, and includes a cross-shaped stem that is formed of a transverse stem 193 and a vertical stem 192 that is perpendicular thereto. In addition, each of the first subpixel electrode 191a and the second subpixel electrode 191b is divided into a first sub-region Da, a second sub-region Db, a third sub-region Dc, and a fourth sub-region Dd by the transverse stem 193 and the vertical stem 192, and includes a plurality of minute branches 194 positioned in each of the sub-regions Da-Dd.

The first subpixel electrode 191a and the second subpixel electrode 191b are respectively connected to the first drain electrode 175a or the second drain electrode 175b through the first contact hole 185a and the second contact hole 185b, thereby receiving a data voltage from the first drain electrode 175a and the second drain electrode 175b. In this case, some of the data voltage applied to the second drain electrode 175b is divided by the third source electrode 173c such that a voltage applied to the first subpixel electrode 191a is greater than that applied to the second subpixel electrode 191b.

The first subpixel electrode 191a and the second subpixel electrode 191b, to which a data voltage is applied, generate an electric field together with a common electrode 270 of the second display substrate 200, thereby determining orientation of the liquid crystal molecules 31 of the liquid crystal layer 3 between the two electrodes 191 and 270. Luminance of light passing through the liquid crystal layer 3 may vary depending on the determined orientation of the liquid crystal molecules 31.

The description related to the thin film transistor and the pixel electrode 191 described above is one example, and the structure of the thin film transistor and the design of the pixel electrode 191 may be varied to improve the lateral visibility.

The first alignment layer 11 is positioned between the pixel electrode 191 and the liquid crystal layer 3. A description of the first alignment layer 11 is the same as described in FIG. 1 and FIG. 2. The first alignment layer may have a multi-layered structure, and in this case, a layer of the multi-layered structure adjacent to the first substrate 110 may include the compound represented by Chemical Formula 11, and a layer of the multi-layered structure adjacent to the liquid crystal layer 3 may include the compound represented by Chemical Formula 10. The first alignment layer 11 may include a photoinitiator, and in this case, the photoinitiator may be benzophenone.

The protrusions 13 are positioned between the first alignment layer 11 and the liquid crystal layer 3. The protrusions 13 are the same as the protrusions described with reference to FIG. 1 and FIG. 2. That is, the protrusion 13 is formed of a polymerization product of, i.e., is formed of a polymer obtained by polymerizing, a photoinitiator, a reactive mesogen, and a vertical alignment additive. In this case, the vertical alignment additive is less reactive than the photoinitiator. A detailed description of the same constituent elements will be omitted.

Next, the second display panel 200 will be described.

The second substrate 210 is positioned to overlap the first substrate 110 while being spaced apart from the first substrate 110. A light blocking member 220 is positioned between the second substrate 210 and the liquid crystal layer 3. The light blocking member 220 is positioned so as to overlap a region in which the data line 171 of the first display panel 100 is positioned and a region in which the thin film transistor, and the like, are positioned. Although it is described and illustrated that the light blocking member 220 is included in the second display panel 200, the present invention is not limited thereto, and the light blocking member may be included in the first display panel 100.

An overcoat 250 is positioned between the light blocking member 220 and the liquid crystal layer 3. In some exemplary embodiments, the overcoat 250 may be omitted.

As one field generating electrode, the common electrode 270 is positioned between the overcoat 250 and the liquid crystal layer 3. The common electrode 270 generates an electric field together with the pixel electrode 191 of the first display panel 100, thereby determining orientation of the liquid crystal molecules 31 of the liquid crystal layer 3. No alignment layer and protrusion are provided at the second substrate 210.

The liquid crystal layer 3 includes the liquid crystal molecules 31. In this case, the liquid crystal layer 3 may include some of an unreacted vertical alignment additive and a reactive mesogen. In the manufacturing process of the liquid crystal display according to the present exemplary embodiment, the vertical alignment additive and the reactive mesogen are included inside the liquid crystal layer and then react by a UV light irradiation process to form protrusions, and in this case, some of the vertical alignment additive and the reactive mesogen may remain in the liquid crystal layer.

Figure 11:
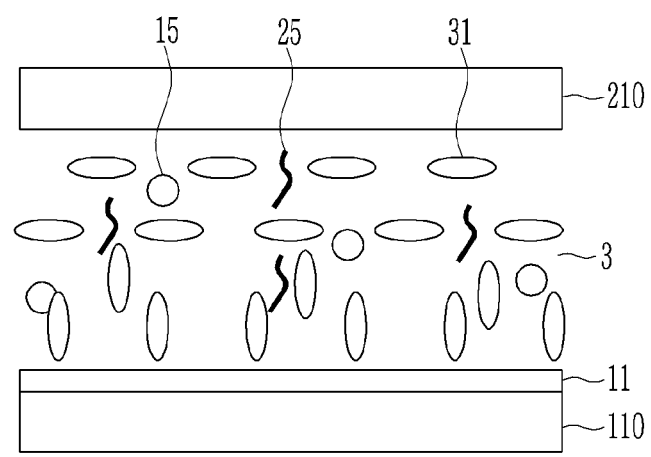
FIG. 11 to FIG. 13 illustrate process cross-sectional views of a manufacturing method according to an exemplary embodiment of the present invention.
Figure 12:
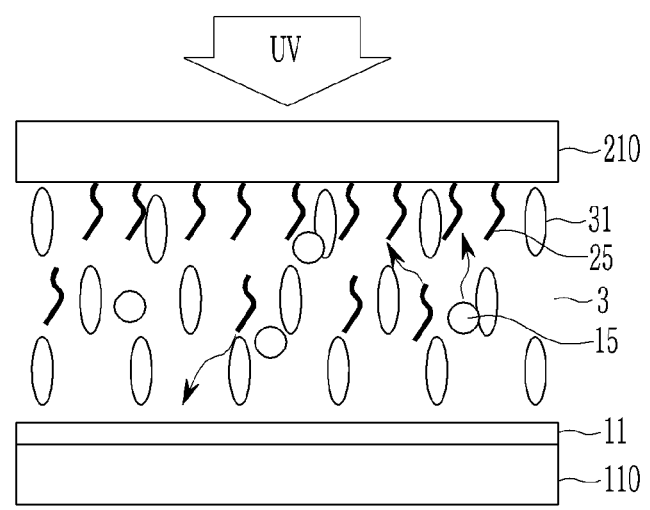
Figure 13:
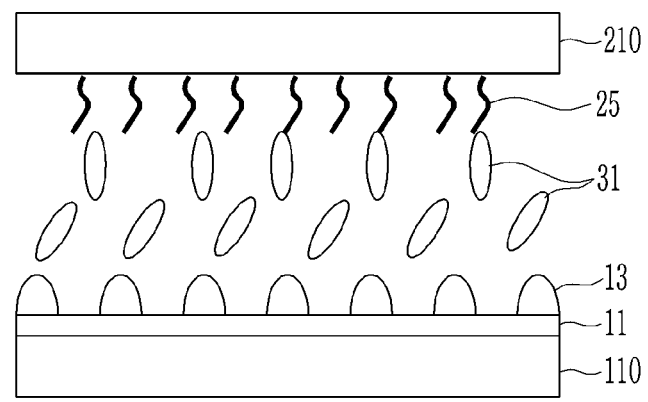

Hereinafter, a method of manufacturing the liquid crystal display according to the present exemplary embodiment will be described with reference to FIGS. 11 to 13. FIG. 11, FIG. 12, and FIG. 13 are cross-sectional views illustrating a method of manufacturing according liquid crystal display to an exemplary embodiment of the present invention.

Referring to FIG. 11, the first substrate 110 provided with the first alignment layer 11 and the second substrate 210 overlapping the first substrate 110 are provided (e.g., prepared). In this case, the first alignment layer 11 is positioned only on the first substrate 110, and is not positioned on the second substrate 210. Although simply shown in FIG. 11, a thin film transistor and a pixel electrode may be positioned at the first substrate 110, and a common electrode may be positioned at the second substrate 210. Alternatively, both a pixel electrode and a common electrode may be positioned at the first substrate 110.

The first alignment layer 11 may include a photoinitiator, and the photoinitiator may be benzophenone. The first alignment layer 11 may include a compound represented by Chemical Formula 10.

[Chemical Formula 10]

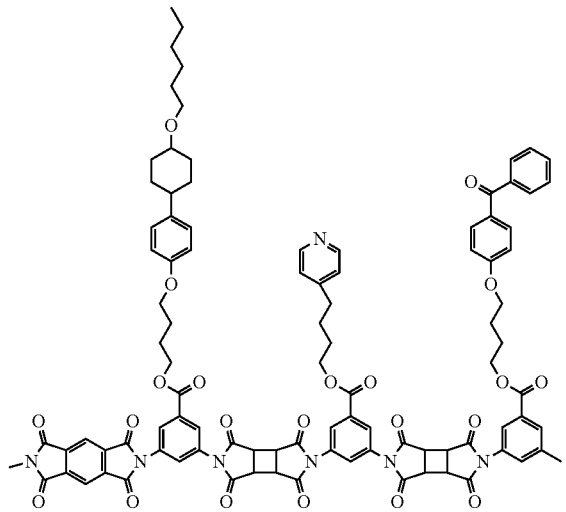

The liquid crystal layer 3 including a plurality of liquid crystal molecules 31, a reactive mesogen 15, and a vertical alignment additive 25 is formed between the first substrate 110 and the second substrate 210, which overlap each other.

In this case, the reactive mesogen 15 may be one or more of an acrylate, a methacrylate, an epoxy, an oxetane, a vinyl-ether, or a styrene.

The vertical alignment additive 25 includes a material that is less reactive than the photoinitiator of the first alignment layer 11. Specifically, with respect to ultraviolet light having a central wavelength of about 300 nm to about 350 nm, the absorbance of the vertical alignment additive is lower than the absorbance of the photoinitiator.

The vertical alignment additive 25 may include a hydroxyl group at an end thereof, preferably at one end thereof, does not include a biphenyl structure, and may include two or more end groups represented by Chemical Formula 6.

[Chemical Formula 6]

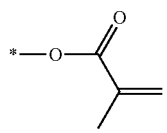

Alternatively, the vertical alignment additive 25 may include a hydroxyl group at an end thereof, preferably at one end thereof, may include a biphenyl structure, and may include two or more end groups represented by Chemical Formula 7.

[Chemical Formula 7]
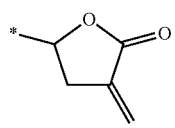
In addition, the vertical alignment additive 25 may be one or more of compounds represented by Chemical Formulas 1 to 5.
[Chemical Formula 1]
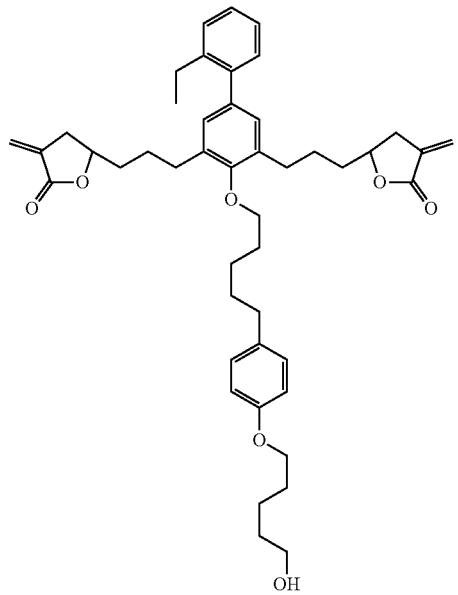
[Chemical Formula 2]
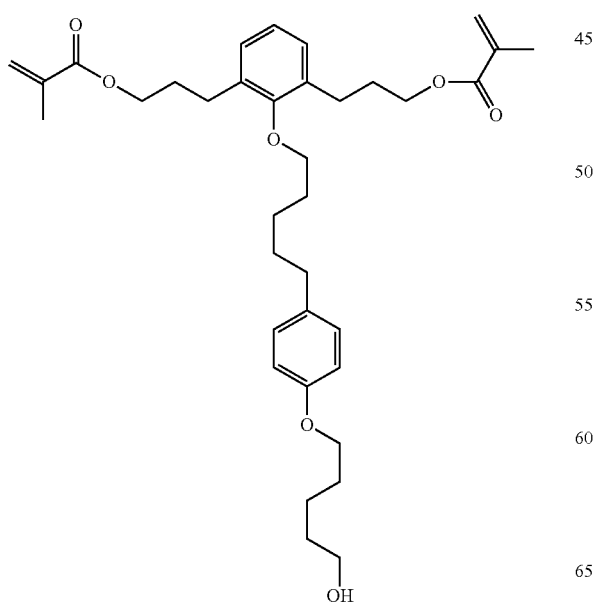
[Chemical Formula 3]
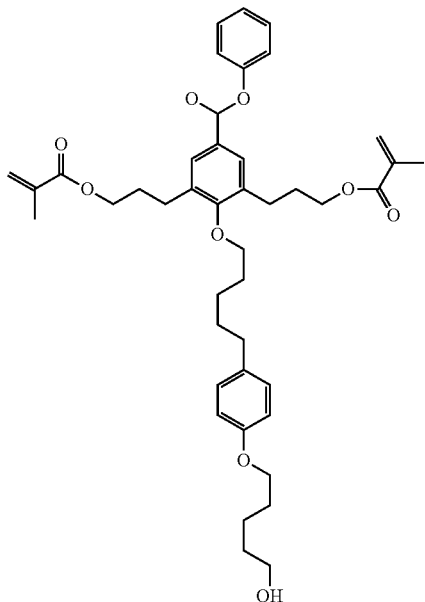
[Chemical Formula 4]
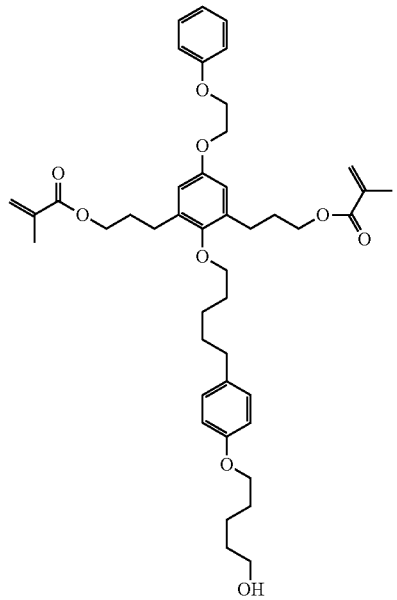

-continued

[Chemical Formula 5]

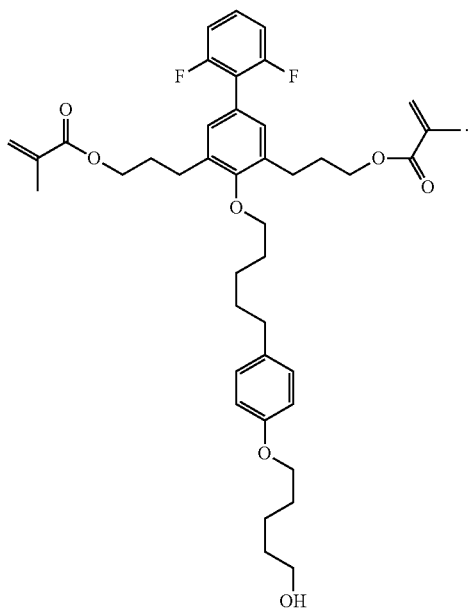

In this case, a content of the vertical alignment additive 25 may be 0.1 wt % to 3 wt % with respect to the total weight of the liquid crystal layer 3. When the content is less than 0.1 wt %, the liquid crystal molecules 31 may not be sufficiently vertically aligned, and when the content is greater than 3 wt %, the vertical alignment additive 25 may not be dissolved in the liquid crystal layer 3.

Referring to FIG. 12, UV light is irradiated toward the first substrate 110 and the second substrate 210. A central wavelength of the irradiated UV light may be about 300 nm to about 350 nm. The photoinitiator included in the first alignment layer is activated by the irradiation of the UV light, and the reactive mesogen 15 and the vertical alignment additive 25 react with each other in the vicinity of the photoinitiator and are polymerized. Unreacted vertical alignment additive 25 remains inside of the liquid crystal layer, and vertically aligns the liquid crystal molecules 31.

Referring to FIG. 13, the protrusions 13 are formed by the polymerization process which occurs on the first alignment layer 11 as a result the UV light irradiation of the previous process. The protrusions 13 are thus formed of a polymer obtained by polymerizing the photoinitiator, the reactive mesogen 15, and the vertical alignment additive 25.

Due to the formation of the protrusions 13, the liquid crystal molecules adjacent to the first substrate 110 have a pretilt. However, the second substrate 210 is not provided with an alignment layer, thus no protrusion 13 is formed at the second substrate because there is no photoinitiator present to induce the polymerization reaction between the reactive mesogen 15 and the vertical alignment additive 25. Accordingly, the liquid crystal molecules adjacent to the second substrate 210 are aligned to be perpendicular to the second substrate 210.

That is, as shown in FIG. 13, the pretilt angle of the liquid crystal molecules 31 adjacent to the first substrate 110 is different from the angle of the liquid crystal molecules 31 adjacent to the second substrate 210, and as a result the texture defects may be prevented from occurring when the liquid crystal display is bent in a curved shape.

The pretilt angle difference occurs because the first alignment layer 11 and the protrusions 13 are positioned only on the first substrate 110. In addition, without being limited by theory, it is believed that the reason that the protrusions 13 are formed only on the first alignment layer 11 is because the reaction between the vertical alignment additives 25 or between the vertical alignment additive 25 and the reactive mesogen 15 is blocked in the absence of the photoinitiator by using the vertical alignment additive 25 made of a less reactive material than the photoinitiator.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A liquid crystal display comprising:
a first substrate;
a second substrate overlapping the first substrate and spaced apart therefrom;
a liquid crystal layer between the first substrate and the second substrate, and comprising liquid crystal molecules and a vertical alignment additive;
a first alignment layer between the first substrate and the liquid crystal layer; and
a plurality of protrusions between the first alignment layer and the liquid crystal layer,
wherein the first alignment layer comprises a photoinitiator,
wherein the plurality of protrusions comprise a polymerization product of the photoinitiator, a reactive mesogen, and the vertical alignment additive, and the vertical alignment additive is less reactive than the photoinitiator in a wavelength range of 300 nanometers to 350 nanometers,
wherein the vertical alignment additive is one or more of compounds represented by Chemical Formulas 1 to 5:

[Chemical Formula 1]

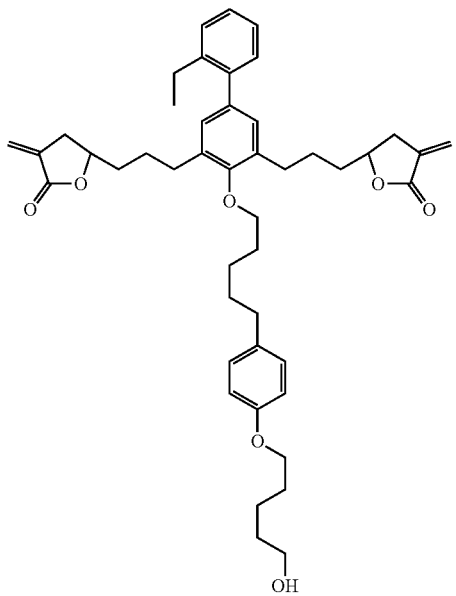

[Chemical Formula 2]

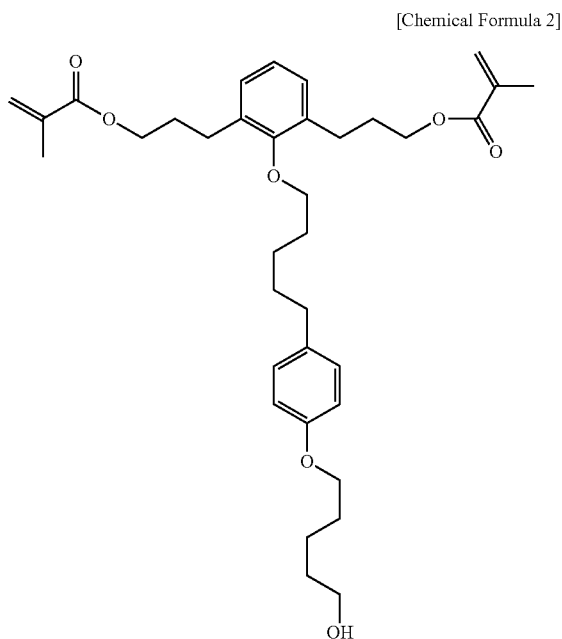

[Chemical Formula 3]

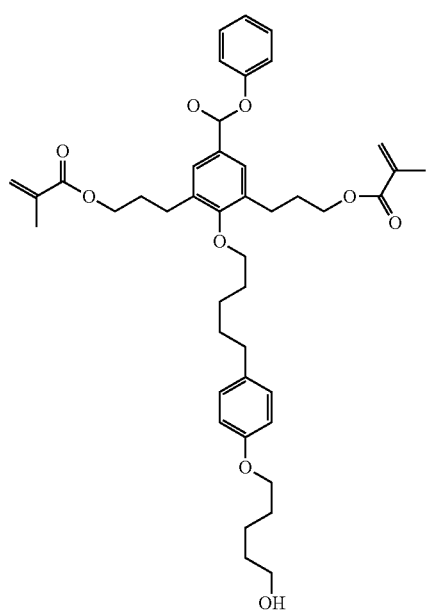

[Chemical Formula 4]

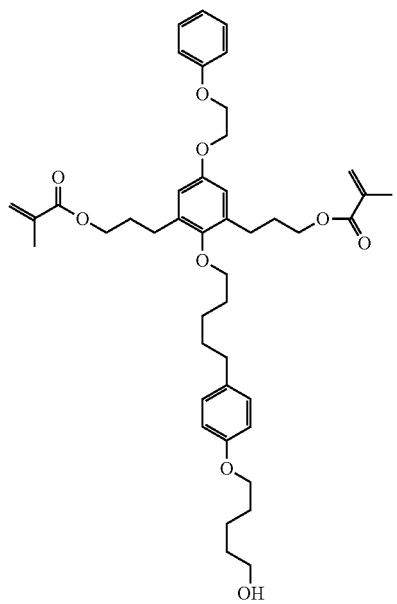

[Chemical Formula 5]

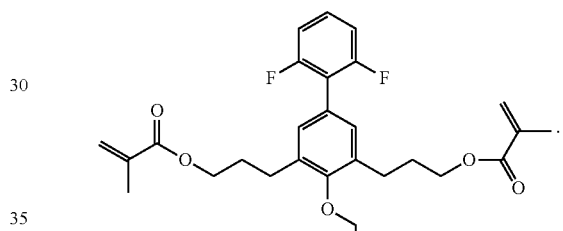

2. The liquid crystal display of claim 1, wherein the photoinitiator is benzophenone.

3. The liquid crystal display of claim 1, wherein no protrusion of the plurality of protrusions is present between the second substrate and the liquid crystal layer.

4. The liquid crystal display of claim 1, wherein
the liquid crystal molecules adjacent to the second substrate are aligned at an angle perpendicular to the second substrate.

5. The liquid crystal display of claim 4, wherein
a difference between the pretilt angle of the liquid crystal molecules adjacent to the first substrate and the pretilt angle of the liquid crystal molecules adjacent to the second substrate is 0.2 degree or greater.

6. The liquid crystal display of claim 1, wherein the vertical alignment additive is a compound represented by Chemical Formula 1:

[Chemical Formula 1]

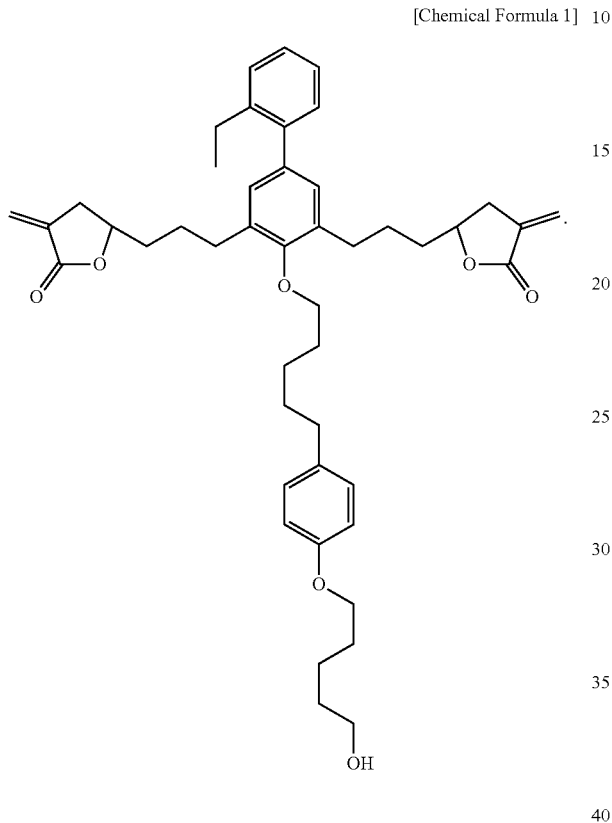

7. A liquid crystal display comprising:

a first substrate;

a second substrate overlapping the first substrate and spaced apart therefrom;

a liquid crystal layer between the first substrate and the second substrate and comprising liquid crystal molecules and a vertical alignment additive;

a first alignment layer positioned between the first substrate and the liquid crystal layer; and a plurality of protrusions between the first alignment layer and the liquid crystal layer, wherein the first alignment layer comprises a photoinitiator, wherein the plurality of protrusions comprise a polymerization product of the photoinitiator, a reactive mesogen, and the vertical alignment additive, wherein an alignment layer is not present between the second substrate and the liquid crystal layer, and wherein the vertical alignment additive is one or more of compounds represented by Chemical Formulas 1 to 5:

[Chemical Formula 1]

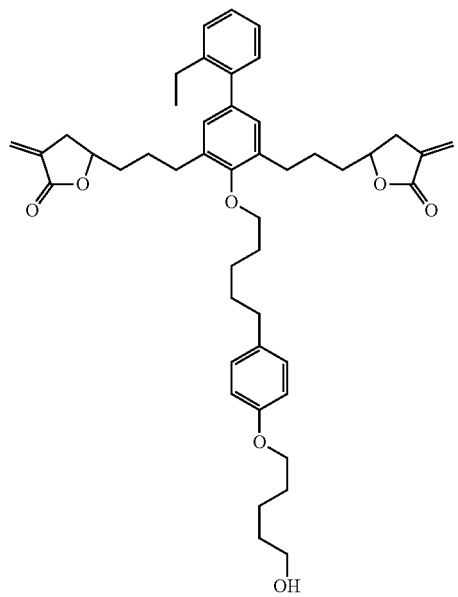

[Chemical Formula 2]

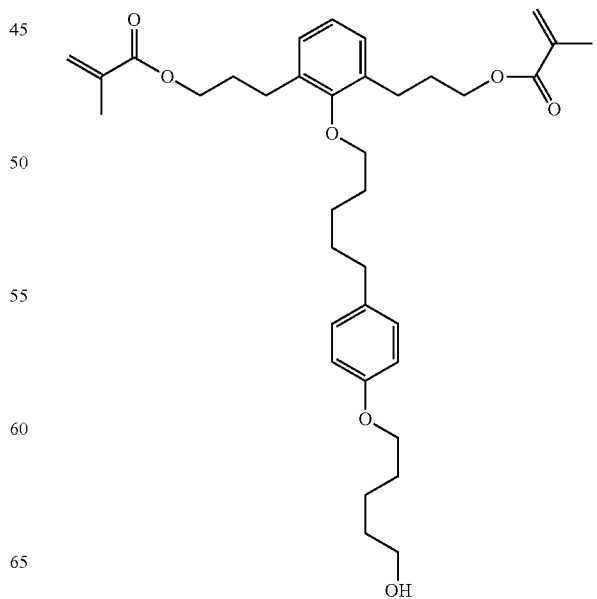

[Chemical Formula 3]

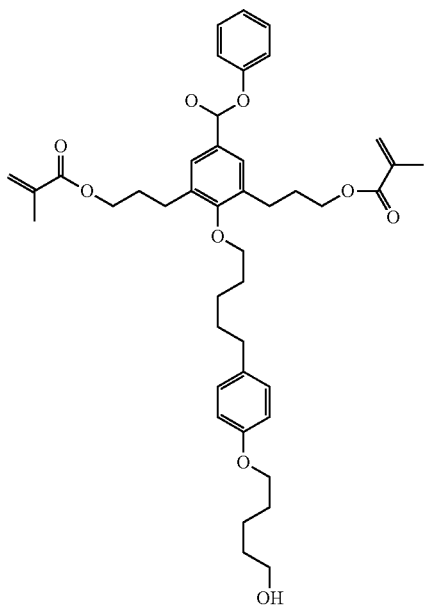

[Chemical Formula 4]

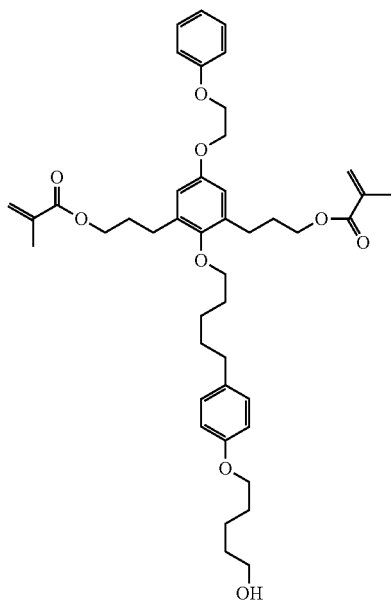

[Chemical Formula 5]

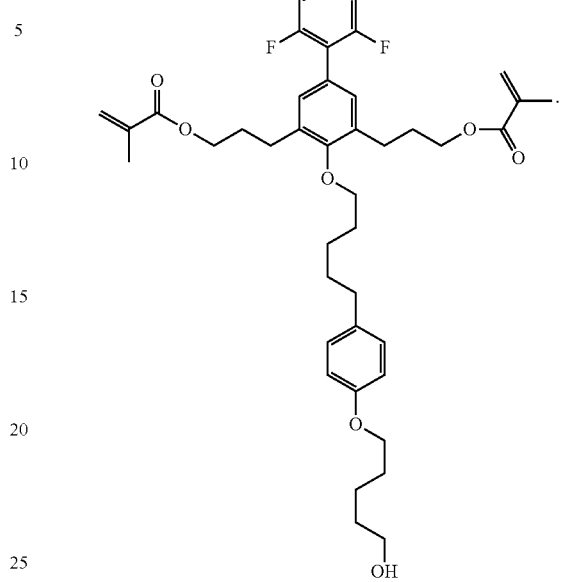

8. The liquid crystal display of claim 7, wherein the vertical alignment additive is less reactive than the photoinitiator in a wavelength range of 300 nanometers to 350 nanometers.

9. The liquid crystal display of claim 7, wherein the liquid crystal display has a curved shape.

10. The liquid crystal display of claim 7, wherein the photoinitiator is benzophenone.

11. The liquid crystal display of claim 7, wherein
no protrusion of the plurality of protrusions is present between the second substrate and the liquid crystal layer.

12. The liquid crystal display of claim 7, wherein
liquid crystal molecules adjacent to the first substrate are aligned at a pretilt angle, and
liquid crystal molecules adjacent to the second substrate are aligned at an angle perpendicular to the second substrate.

13. The liquid crystal display of claim 12, wherein
a difference between the pretilt angle of the liquid crystal molecules adjacent to the first substrate and the angle of the liquid crystal molecules adjacent to the second substrate is 0.2 degree or greater.

14. A method of manufacturing a liquid crystal display, comprising:
providing a first substrate comprising a first alignment layer comprising a photoinitiator;
providing a second substrate overlapping the first substrate;
forming a liquid crystal layer comprising a plurality of liquid crystal molecules, a reactive mesogen, and a vertical alignment additive between the first substrate and the second substrate, wherein the vertical alignment additive is less reactive than the photoinitiator in a wavelength range of 300 nanometers to 350 nanometers;
irradiating ultraviolet light toward the first substrate and the second substrate; and, polymerizing the photoinitiator, the reactive mesogen, and the vertical alignment additive to form the liquid crystal display, wherein the first alignment layer includes a photoinitiator, wherein the photoinitiator, the reactive mesogen, and the vertical alignment additive are polymerized by the ultraviolet light to form a plurality of protrusions on the first alignment layer, wherein the liquid crystal display is a curved liquid crystal display, and wherein the vertical alignment additive is one or more of compounds represented by Chemical Formulas 1 to 5:

[Chemical Formula 1]

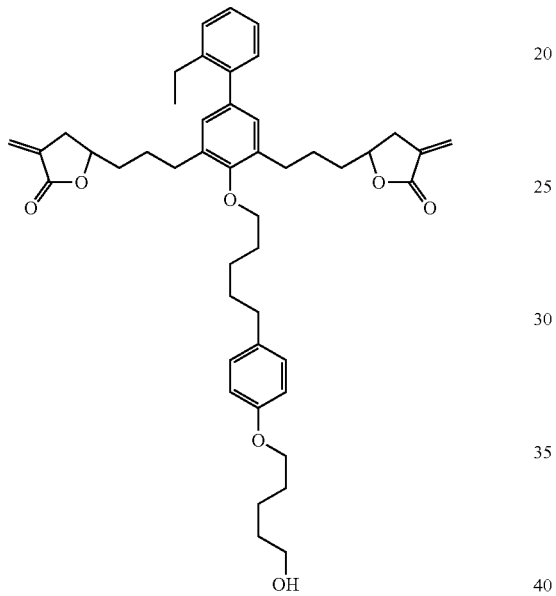

[Chemical Formula 2]

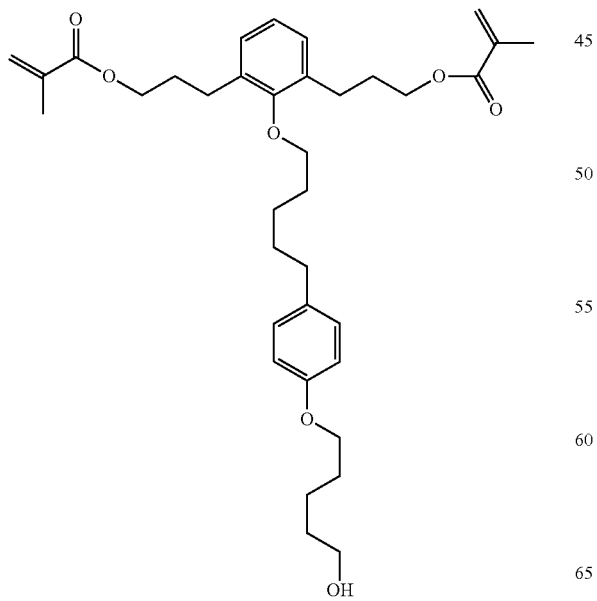

[Chemical Formula 3]

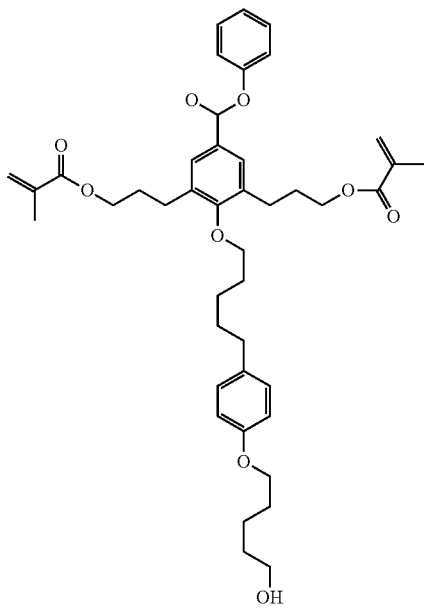

[Chemical Formula 4]

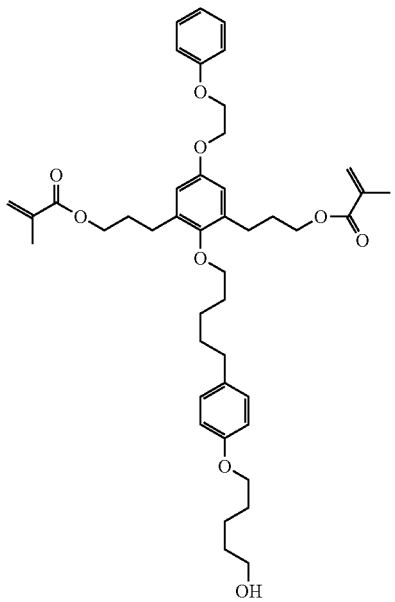

-continued

[Chemical Formula 5]

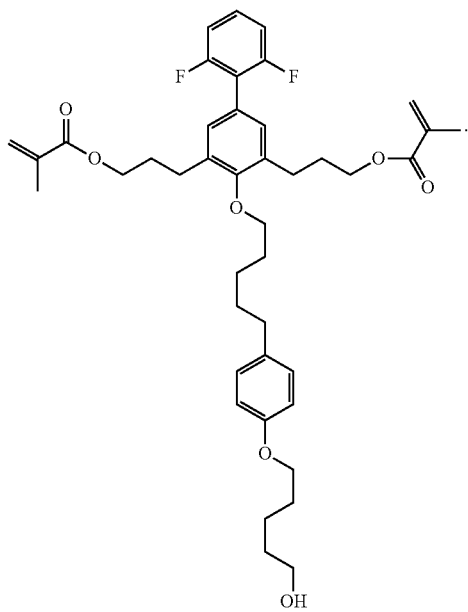

15. The method of manufacturing the liquid crystal display of claim 14, wherein the photoinitiator is benzophenone.

16. The method of manufacturing the liquid crystal display of claim 14, wherein a content of the vertical alignment additive is about 0.1 weight percent to about 3 weight percent based on the total weight of the liquid crystal layer.

17. The method of manufacturing the liquid crystal display of claim 14, wherein after the irradiating of the ultraviolet light, liquid crystal molecules adjacent to the first substrate are aligned at a pretilt angle, and liquid crystal molecules adjacent to the second substrate are aligned at an angle perpendicular to the second substrate.

18. The method of manufacturing the liquid crystal display of claim 17, wherein a difference between the pretilt angle of the liquid crystal molecules adjacent to the first substrate and the angle of the liquid crystal molecules adjacent to the second substrate is 0.2 degree or greater.

19. The method of manufacturing the liquid crystal display of claim 14, wherein the vertical alignment additive is a compound represented by Chemical Formula 1:

[Chemical Formula 1]

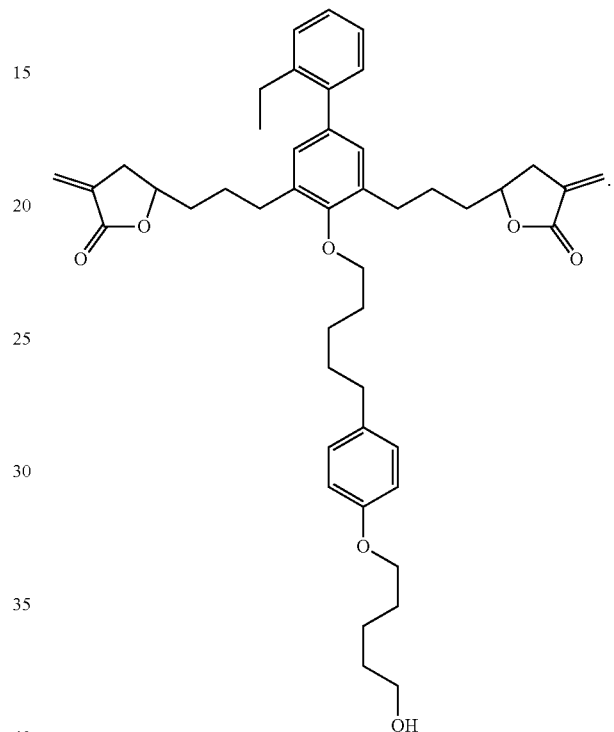

20. The method of manufacturing the liquid crystal display of claim 14, wherein a central wavelength of the ultraviolet light is about 300 nanometers to about 350 nanometers.

* * * * *